US007173392B2

(12) United States Patent
Shinojima et al.

(10) Patent No.: US 7,173,392 B2
(45) Date of Patent: Feb. 6, 2007

(54) SWITCHING CONTROLLER AND METHOD FOR CONTROLLING SWITCHING POSITION

(75) Inventors: Masaaki Shinojima, Nagoya (JP); Tomoyuki Kashiwagi, Chita-gun (JP); Kiyoshi Kimura, Obu (JP); Hiroyuki Shintani, Nagoya (JP); Masashi Hori, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 11/436,525

(22) Filed: May 19, 2006

(65) Prior Publication Data

US 2006/0261760 A1 Nov. 23, 2006

(30) Foreign Application Priority Data

May 19, 2005 (JP) .............................. 2005-147037

(51) Int. Cl.
*G05B 11/01* (2006.01)
(52) U.S. Cl. ...................... 318/630; 318/632; 318/600; 701/41; 180/412; 180/422; 180/443
(58) Field of Classification Search ................ 318/630, 318/632, 600; 701/41, 42; 180/412, 413, 180/422, 443
See application file for complete search history.

(56) References Cited

U.S. PATENT DOCUMENTS 5,202,830 A * 4/1993 Tsurumiya et al. ........... 701/41
5,307,892 A * 5/1994 Phillips ....................... 180/422
5,659,473 A * 8/1997 Noro et al. .................... 701/42
5,732,373 A * 3/1998 Endo ........................... 701/42
6,370,459 B1 * 4/2002 Phillips ........................ 701/41

FOREIGN PATENT DOCUMENTS

JP 2004-138406 5/2004

* cited by examiner

Primary Examiner—Rina Duda
(74) Attorney, Agent, or Firm—Nixon & Vanderhye P.C.

(57) ABSTRACT

A second member and a first member are applied with bias force to mechanically engage with each other at one of detent positions defining relative positions therebetween. An electric motor rotating a rotor therein when being supplied with electricity. Rotation of the rotor is transmitted to an output shaft manipulating the first member. A main controller controls the electric motor to switch the one of the plurality of detent positions. A rotor angle detecting unit detects rotor angle of the rotor. An output angle detecting unit detects output angle of the output shaft. The main controller includes a backlash calculating unit that calculates a backlash amount between the rotor and the first member in accordance with at least one of occurrence of a first region, in which change in the output angle is small with respect to change in the rotor angle, and a range of the rotor angle in the first region. The main controller incorporates the backlash amount into the control of the electric motor.

24 Claims, 13 Drawing Sheets

REVERSE

FORWARD

SWITCHING CONTROLLER AND METHOD FOR CONTROLLING SWITCHING POSITION

CROSS REFERENCE TO RELATED APPLICATIONS

This application is based on and incorporates herein by reference Japanese Patent Applications No. 2005-147037 filed on May 19, 2005.

FIELD OF THE INVENTION

The present invention relates to a switching controller that has a detent device and an electric actuator, the electric actuator switching the detent device. The present invention further relates to a method for controlling a switching position.

BACKGROUND OF THE INVENTION

In general, a shift range switching device is used for switching a shift range of an automatic transmission utilizing an electric actuator constructed of an electric motor and a reduction gears. The shift range switching device switches actual shift range by controlling the rotative direction and rotation angle of the electric motor.

For example, as shown in FIGS. 20A, 20B, a shift range switching device includes a detent device for maintaining the shift range position.

A detent device 40 is constructed of a detent plate 46 and a detent spring 47. The detent plate 46 has multiple detent grooves 46a corresponding to shift ranges P, R, N, D, for example. The detent spring 47 is constructed of a blade spring. The detent spring 47 includes the hooking portion 47a in the tip end thereof. The hooking portion 47a engages with one of the detent grooves 46a.

According to JP-A-2004-138406, an output angle detecting unit detects output angle of an output shaft of a reduction gears to detect an actual shift range. As referred to FIGS. 20A, 20B, the hooking portion 47a of the detent spring 47 is pressed toward the bottom of the detent groove 46a by bias force of the detent spring 47. Therefore, when the hooking portion 47a is distant from the lowest bottom point of the detent groove 46a, the hooking portion 47a applies force to the detent plate 46 such that the hooking portion 47a moves toward the lowest point of the bottom of the detent groove 46a.

When supplying electricity to the electric motor is terminated after switching the shift range, the position of the detent plate needs to coincide with a position, in which the detent device stably stops, for stably positioning the detent plate. Accordingly, the motor control device needs to accurately control the rotation of the electric motor.

A transmission between the output shaft and the detent plate has mechanical backlash and play. Accordingly, the output angle of the output shaft may deviate from the rotation angle of the detent plate due to the backlash and play. The backlash and play are not uniform due to manufacturing tolerance of the components. In addition, the backlash and play may change due to ablation arising in components.

The output angle detecting unit may cause an error when detecting the output angle. Accordingly, it is further difficult to accurately detect the position of the detent plate, due to the detecting error and the backlash and play.

An output angle detecting unit disclosed in JP-A-2004-138406 outputs an analog signal corresponding to change in magnetism generated by rotation of the output shaft. The output angle detecting unit is constructed of a magnet and a linear output hall IC for detecting the output angle of the output shaft as a continuous quantity. However, accuracy of the angle detected using the output angle detecting unit 8 depends on various parameters such as accuracy of magnetism generated from the magnet 71, change in magnetism of the magnet 71 corresponding to change in temperature, reduction in magnetism of the magnet 71 due to heat cycle, and accuracy of assembling the magnet 71.

As influences of these parameters accumulate, the output angle detecting unit 8 loses accuracy. As a result, it is difficult to accurately detect the position of the detent plate.

SUMMARY OF THE INVENTION

The present invention addresses the above disadvantage. According to one aspect of the present invention, a switching controller has a detent device that includes a first member and a second member, which are movable relative to each other. The second member is applied with bias force to mechanically engage with the first member at one of a plurality of detent positions defining relative positions between the first member and the second member. The switching controller further includes an electric actuator that includes an electric motor having a rotor, a reduction gear, and an output shaft. The electric motor rotates the rotor when being supplied with electricity. The reduction gear reduces rotation of the rotor and transmits the rotation to the output shaft manipulating the first member. The switching controller further includes a main controller that controls the electric motor to switch the one of the plurality of detent positions. The switching controller further includes a rotor angle detecting unit that detects rotor angle of the rotor. The switching controller further includes an output angle detecting unit that detects output angle of the output shaft. The main controller includes a backlash calculating unit that calculates a backlash amount between the rotor and the first member in accordance with at least one of occurrence of a first region, in which change in the output angle is small with respect to change in the rotor angle, and a range of the rotor angle in the first region. The main controller incorporates the backlash amount into the control of the electric motor.

Alternatively, a method for operating a switching controller includes applying bias force so as to mechanically engage a first member with a second member at one of a plurality of detent positions defining relative positions between the first member and the second member. The method further includes controlling electricity supplied to an electric motor, thereby rotating a rotor of the electric motor. The method further includes reducing rotation of the rotor. The method further includes transmitting the rotation of the rotor to the output shaft, thereby manipulating the first member so as to switch the one of the plurality of detent positions. The method further includes detecting rotor angle of the rotor. The method further includes detecting output angle of the output shaft. The method further includes calculating a backlash amount between the rotor and the first member in accordance with at least one of occurrence of a first region, in which change in the output angle is small with respect to change in the rotor angle, and a range of the rotor angle in the first region. The method further includes incorporating the backlash amount into the controlling electricity supplied to the electric motor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

The first embodiment is described in reference to FIGS. 1 to 15.

Figure 3:
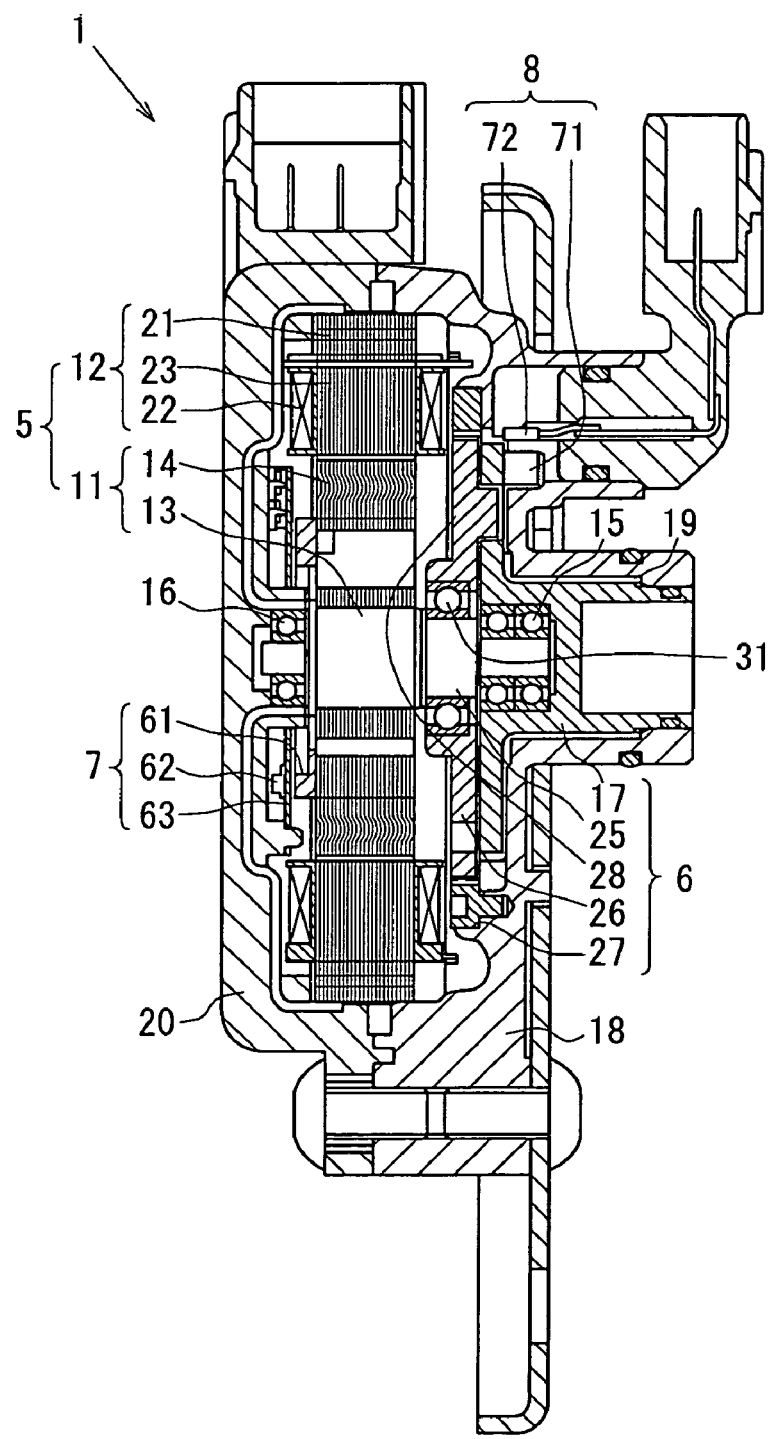
FIG. 3 is a partially cross sectional side view showing an electric actuator of the shift range switching device, according to the first embodiment.
Figure 4:
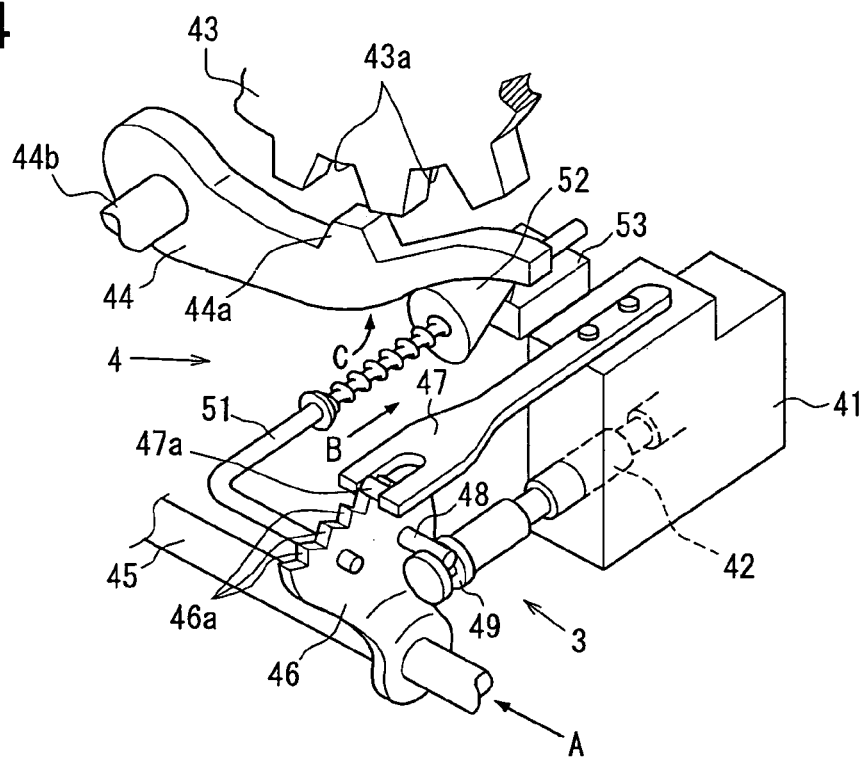
FIG. 4 is a perspective view showing the shift range switching device according to the first embodiment.

An electric actuator 1 shown in FIGS. 3, 4 is a servo device that operates a shift range switching device 3. The electric actuator 1 includes a synchronous electric motor 5, a reduction gear (reduction unit) 6, a rotor angle detecting unit 7, and an output angle detecting unit 8. The reduction gears 6 reduce rotation speed of the electric motor 5 so that the reduction gears 6 operates the shift range switching device 3. The rotor angle detecting unit 7 detects rotation angle of the electric motor 5. Specifically, the rotor angle detecting unit 7 detects rotor angle of a rotor 11. The output angle detecting unit 8 detects output angle of the reduction gear 6, corresponding to an actual shift range. The electric motor 5 operates the shift range switching device 3 via the reduction gear 6. The electric motor 5 is controlled using a motor control device (main controller) 9. Specifically, the motor control device 9 controls the rotative direction of the electric motor 5, the rotation speed (number of rotation) of the electric motor 5, and rotation angle of the electric motor 5, thereby switching the shift range switching device 3 and a parking device 4 via the reduction gear 6 in this shift range switching apparatus. Thus, the motor control device 9 operates an actual shift range of an automatic transmission 2 and sets the automatic transmission 2 at a parking condition, in which an output shaft of the automatic transmission 2 is locked.

In the following description, the right side in FIG. 3 is defined as a front side, and the left side in FIG. 3 is defined as a rear side.

Figure 5:
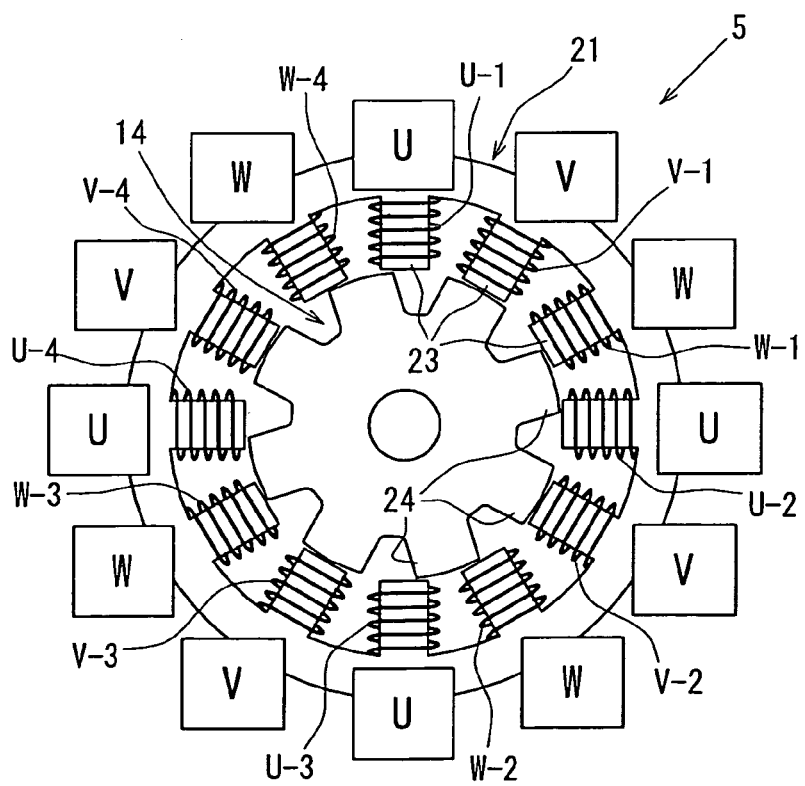
FIG. 5 is a schematic view showing an electric motor according to the first embodiment.

Next, the electric motor 5 is described in reference to FIGS. 3, 5. The electric motor 5 is a blushless switched reluctance motor (SR motor), in which a permanent magnet is not used. The electric motor 5 includes a rotor 11 and a stator 12. The rotor 11 is rotatable. The stator 12 is arranged coaxially with respect to the rotation center of the rotor 11.

The rotor 11 is constructed of a rotor shaft 13 and a rotor core 14. The rotor shaft 13 is rotatably supported using a front ball bearing 15 and a rear ball bearing 16. The front ball bearing 15 is provided to a front end of the rotor shaft 13, and the rear ball bearing 16 is provided to a rear end of the rotor shaft 13.

The front ball bearing 15 engages with the inner circumferential periphery of an output shaft 17 of the reduction gears 6. The output shaft 17 of the reduction gears 6 is rotatably supported via a metal bearing 19, which is arranged in the inner circumferential periphery of the front housing 18. That is, the front end of the rotor shaft 13 is rotatably supported via the metal bearing 19, the output shaft 17, and the front ball bearing 15, which are provided in a front housing 18.

The rear ball bearing 16 is press-inserted onto the outer circumferential periphery of the rear end of the rotor shaft 13, thereby being supported by a rear housing 20.

Figure 6:
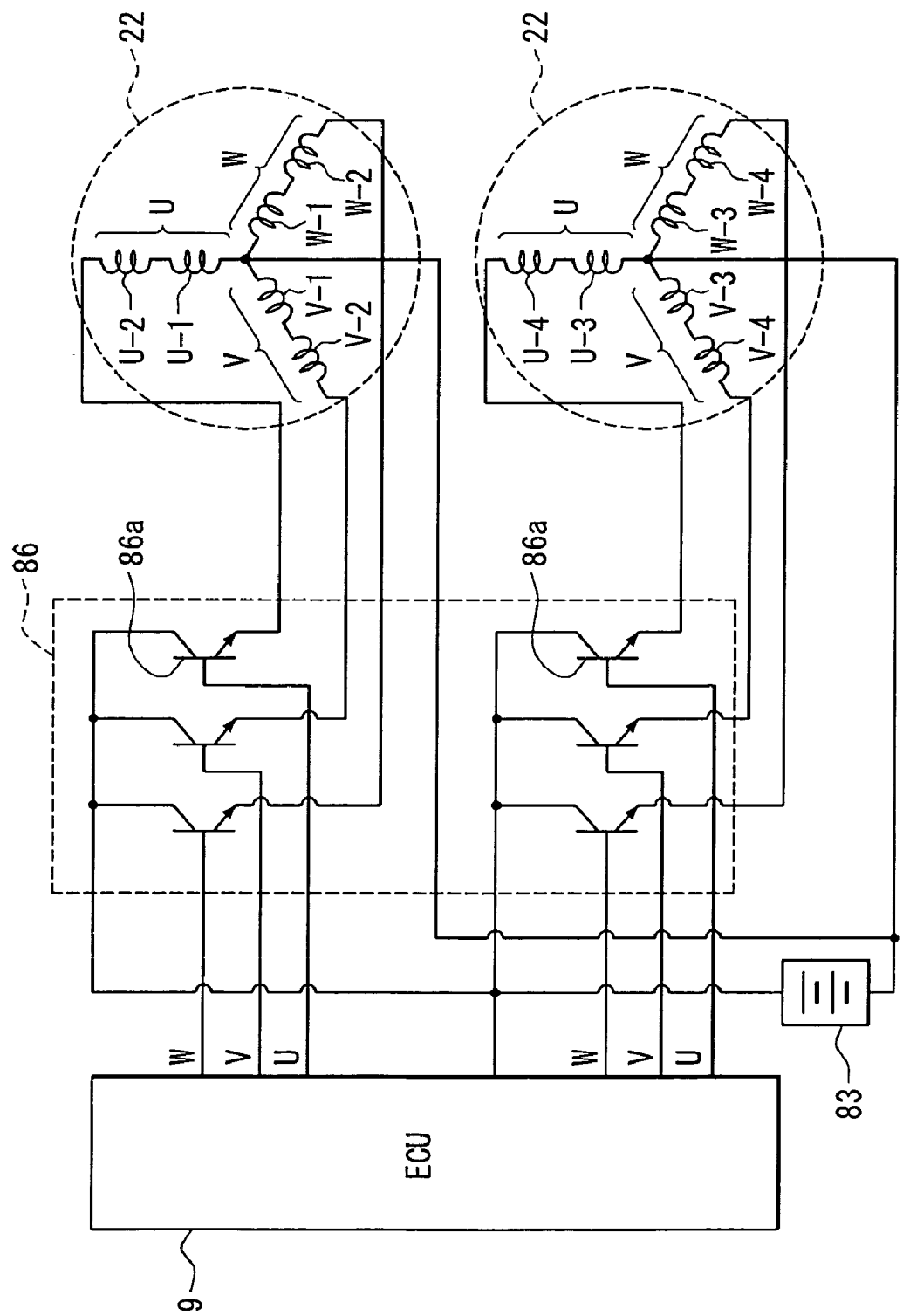
FIG. 6 is a schematic diagram showing an electric connection of the electric motor, according to the first embodiment.

The stator 12 is constructed of a fixed stator core 21 and magnetizing coils (coil devices) 22. As shown in FIG. 6, the coil devices 22 respectively generate magnetic force by being energized. Each of the coil device 22 is multiphase.

As referred to FIG. 3, the stator core 21 is constructed of stacked thin plates. The stator core 21 is fixed to the rear housing 20. As referred to FIG. 5, the stator core 21 has stator teeth 23 (introverted salient poles) that protrude inwardly toward the rotor core 14. The stator teeth 23 are arranged at substantially regular circumferential intervals, which are substantially 30°. Each of the coils U, V, and W is wound around each of the stator teeth 23 to generate magnetic force in each of the stator teeth 23.

Next, the coil devices 22 are described in reference to FIGS. 5, 6. As shown in FIG. 6, the coils U, V, and W of one of the coil devices 22 on the upper side in FIG. 6 are wound separately from the coils U, V, and W of the other of the coil devices 22 on the lower side in FIG. 6. The coils U, V, and W of the one of the coil devices 22 and the coils U, V, and W of the other of the coil devices 22 are connected respectively in a manner of the star connection.

As referred to FIG. 5, the coils U, V, and W of each of the coil devices 22 are respectively wound around the stator teeth 23, which are successive with respect to the rotative direction. Each of the coil devices 22 is supplied with electricity, so that the stator teeth 23 indicate magnetic poles. Specifically, in this energizing condition, the stator teeth 23, which are adjacent to each other with respect to the rotative direction, indicate magnetic poles, which are opposite to each other. More specifically, when the radially inside of the coils U-1, W-1, V-2, U-3, W-3, and V-4 indicate the N-pole, the radially inside of the coils V-1, U-2, W-2, V-3, U-4, and W-4 indicate the S-pole, for example. In this case, the coils U-1, W-1, V-2, U-3, W-3, and V-4 are respectively adjacent to the corresponding coils V-1, U-2, W-2, V-3, U-4, and W-4.

Thus, when the coils U-1, U-2, U-3, and U-4 are supplied with electricity, the radially inside of one group of the stator teeth 23 having the coils U-1, U-3 indicates the N-pole, and the radially inside of another group of the stator teeth 23 having the coils U-2, U-4 indicates the S-pole. The coils U-1, U-3 are distant respectively from the coils U-2, U-4 by 90° with respect to the rotative direction.

As referred to FIG. 3, the rotor core 14 is constructed by stacking thin plates. The rotor core 14 is press-inserted into and fixed to the rotor shaft 13. The rotor core 14 has rotor teeth 24 (extroverted salient poles, FIG. 5) that outwardly protrude to the stator core 21 on the radially outer side thereof. The rotor teeth 24 are arranged at substantially regular circumferential intervals, which are substantially 45°, for example.

The energizing position and the energizing direction of the coil device 22 of the U-phase, V-phase, and W-phase are sequentially switched, so that the stator teeth 23, which magnetically attract the rotor teeth 24, are switched. Thus, the rotor 11 is rotated in both the normal direction and the reverse direction.

Figure 7:
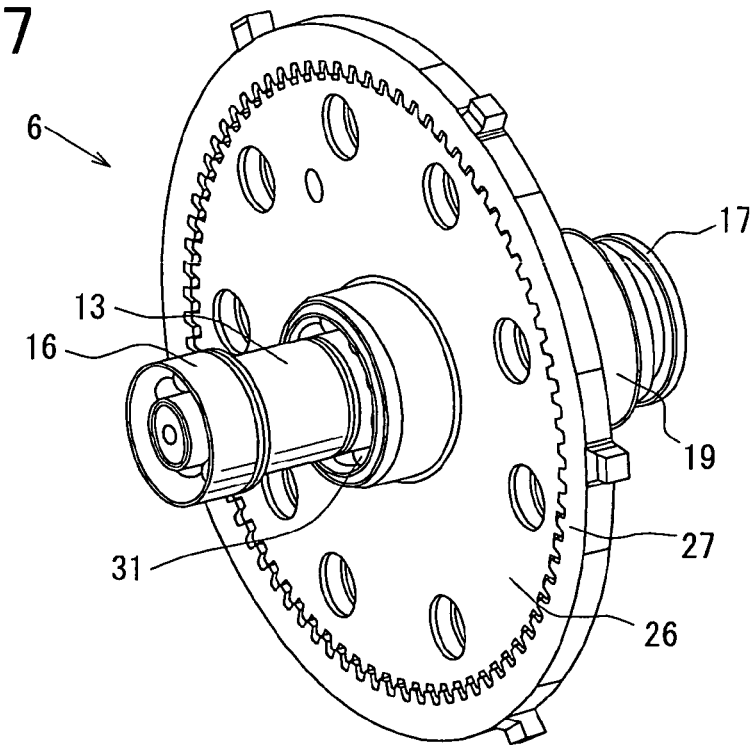
FIG. 7 is a perspective rear view showing a reduction gear according to the first embodiment.
Figure 8:
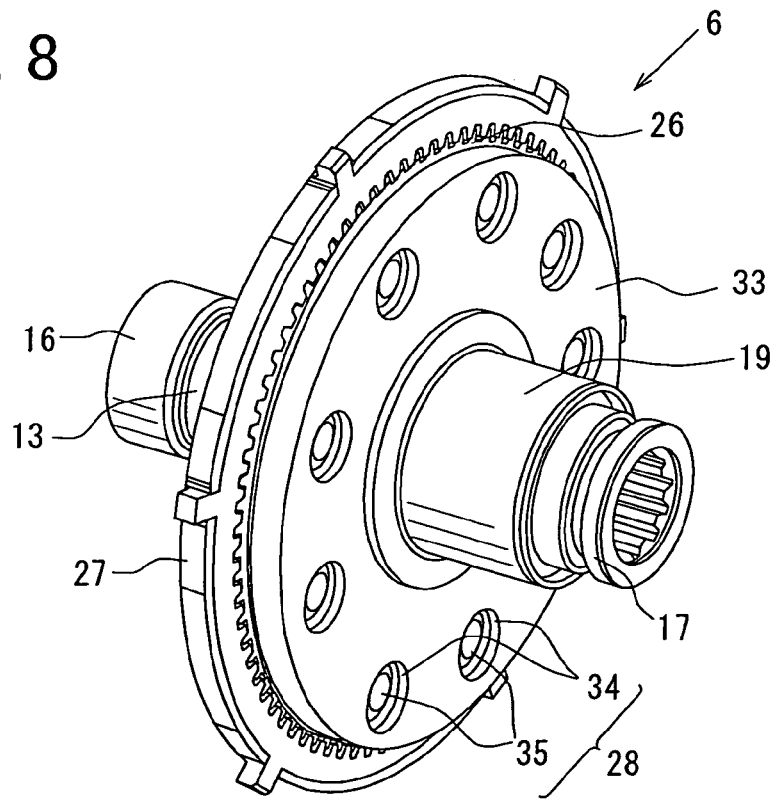
FIG. 8 is a perspective front view showing the reduction gear according to the first embodiment.
Figure 9:
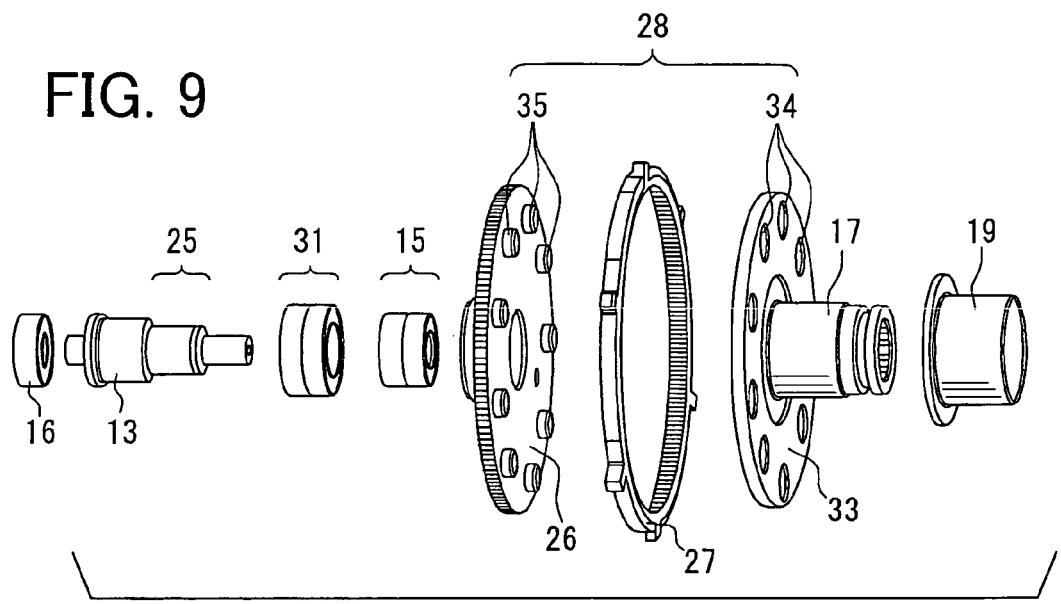
FIG. 9 is an exploded perspective view showing the reduction gear according to the first embodiment.

Next, the reduction gears 6 are described in reference to FIGS. 7 to 9.

The reduction gears 6 are cycloidal gears, for example. The reduction gears 6 are some type of a planetary gear train, which constructs an inscribed planetary gear reduction mechanism. The reduction gears 6 includes a sun gear 26 (inner gear, external gear), a ring gear 27 (outer gear, internal gear), and a transmission device 28. The sun gear 26 is capable of rotating eccentrically with respect to the rotor shaft 13 via an eccentric portion 25, which is provided to the rotor shaft 13. The ring gear 27 internally engages with the sun gear 26. The transmission device 28 transmits rotation of the sun gear 26 to the output shaft 17.

The eccentric portion 25 is an axis that rotates eccentrically with respect to the rotation center of the rotor shaft 13, thereby rotating the sun gear 26 along an orbital path. The eccentric portion 25 rotatably supports the sun gear 26 via a sun gear bearing 31, which is provided to the circumferential outer periphery of the eccentric portion 25.

As described above, the sun gear 26 is rotatably supported via the sun gear bearing 31 such that the sun gear 26 is capable of rotating with respect to the eccentric portion 25 of the rotor shaft 13. As the eccentric portion 25 rotates, The sun gear 26 is rotated in a condition, in which the sun gear 26 is pressed onto the ring gear 27. The ring gear 27 is fixed to the front housing 18.

The output shaft 17 rotates integrally with a flange 33. The flange 33 is arranged to the rear end of the output shaft 17. The flange 33 has multiple inner pin holes 34, which are formed coaxially with the flange 33. The sun gear 26 has a front surface, from which multiple inner pins 35 protrude. The inner pins 35 of the sun gear 26 loosely engage with the inner pin holes 34 of the flange 33, so that the transmission device 28 is constructed. Thus, rotation of the sun gear 26 is transmitted to the output shaft 17.

In this structure, the rotor shaft 13 rotates, so that the sun gear 26 eccentrically rotates, and the sun gear 26 reduces rotation speed with respect to the rotation of the rotor shaft 13. The reduced rotation speed of the sun gear 26 is transmitted to the output shaft 17. The output shaft 17 connects with a control rod 45 (FIG. 4) of the shift range switching device 3.

The sun gear 26 may have the multiple inner pin holes 24, and the flange 33 may have the multiple inner pins 35, dissimilarly to the above structure.

Next, the shift range switching device 3 and the parking device 4 are described in reference to FIGS. 3, 4.

The shift range switching device 3 is operated using the output shaft 17 of the reduction gears 6, so that the shift range switching device 3 switches the actual shift range of the automatic transmission 2.

A manual spool valve 42 provided to a hydraulic valve body 41 is slid and displaced to a predetermined position, so that hydraulic passages are switched. The hydraulic passages are connected to a hydraulic clutch (not shown) of the automatic transmission 2. Thus, the engagement condition of the hydraulic clutch is controlled, so that the shift ranges such as P, R, N, and D in the automatic transmission 2 are switched.

The parking device 4 mechanically locks the output shaft of the automatic transmission 2 when the actual shift range is set at the parking range (P) in conjunction with the shift range switching device 3. The parking device 4 locks and unlocks the output shaft of the automatic transmission 2 by engagement and disengagement between a recession 43a of a park gear 43 and a protrusion 44a of the park pole 44. The park gear 43 connects with the output shaft of the automatic transmission 2 via a driveshaft (not shown) and a differential gear (not shown). The park gear 43 is restricted in rotation thereof, so that the output shaft of the automatic transmission 2 on the side of the drive wheel of the vehicle is locked, consequently the vehicle becomes in the parking condition.

The control rod 45 is driven using the reduction gears 6. A detent plate 46, which is in a substantially sector form, is connected to the control rod 45 with a spring pin or the like (not shown). The detent plate 46 has multiple detent grooves 46a in the radially tip end thereof. The radially tip end of the detent plate 46 is the arc shaped portion in the sector-shaped portion. A detent spring 47 is fixed to the hydraulic valve body 41. The detent spring 47 has a hooking portion 47a in the tip end thereof. The hooking portion 47a hooks to one of the detent grooves 46a of the detent plate 46, so that the shift range is maintained.

The detent plate 46 has a pin 48 that operates the manual spool valve 42. The pin 48 engages with a groove 49 that is formed in the end of the manual spool valve 42. When the detent plate 46 is rotated via the control rod 45, the pin 48 is moved along an arch-shaped path, so that the manual spool valve 42, which engages with the pin 48, linearly moves in the hydraulic valve body 41.

When the control rod 45 is rotated in the clockwise direction with respect to the direction when being viewed from the arrow A in FIG. 4, the pin 48 pushes the manual spool valve 42 into the hydraulic valve body 41 via the detent plate 46. Thus, the hydraulic passages in the hydraulic valve body 41 are switched in the order of D, N, R, and P ranges, so that the shift ranges of the automatic transmission 2 are switched in the order of D, N, R, and P ranges. When the control rod 45 is rotated in the reverse direction, the pin 48 pulls the manual spool valve 42 from the hydraulic valve body 41, so that the hydraulic passages in the hydraulic valve body 41 are switched in the order of P, R, N, and D ranges. Thus, the shift ranges of the automatic transmission 2 are switched in the order of P, R, N, and D ranges.

The detent plate 46 is provided with a park rod 51 for operating the park pole 44. The park rod 51 has a tip end, to which a conical portion 52 is provided.

The conical portion 52 is interposed between a protrusion 53 of the housing of the automatic transmission 2 and the park pole 44. When the control rod 45 is rotated from the R range to the P range in the clockwise direction with respect to the direction when being viewed from the arrow A in FIG. 4, the park rod 51 is displaced via the detent plate 46 in the direction shown by arrow B in FIG. 4. Thus, the conical portion 52 raises the park pole 44, so that the park pole 44 rotates around a shaft 44b in the direction shown by the arrow C in FIG. 4. Thus, the protrusion 44a of the park pole 44 engages with the recession 43a of the park gear 43. In this condition, the parking device 4 becomes in a lock condition.

When the control rod 45 is rotated from the P range to the R range in the counterclockwise direction, the park rod 51 is pulled in the direction opposite to the arrow B in FIG. 4, so that the conical portion 52 terminates raising the park pole 44. The park pole 44 is regularly biased using a spring (not shown) in the direction opposite to the arrow C in FIG. 4, so that the protrusion 44a of the park pole 44 is detached from the recession 43a of the park gear 43. In this condition, the park gear 43 becomes free from the park pole 44, so that the parking device 4 becomes in the unlock condition.

Next, the rotor angle detecting unit 7 is described in reference to FIGS. 3, 10A to 14B. The electric actuator 1 has the housing, which is constructed of the front housing 18 and the rear housing 20. The housing of the electric actuator 1 accommodates the rotor angle detecting unit 7 that detects the rotation angle of the rotor 11. The electric motor 5 can be rotated at high speed while maintaining synchronism, by detecting the rotation angle of the rotor 11 using the rotor angle detecting unit 7 and switching electricity supply to the coil device 22.

Figure 13:
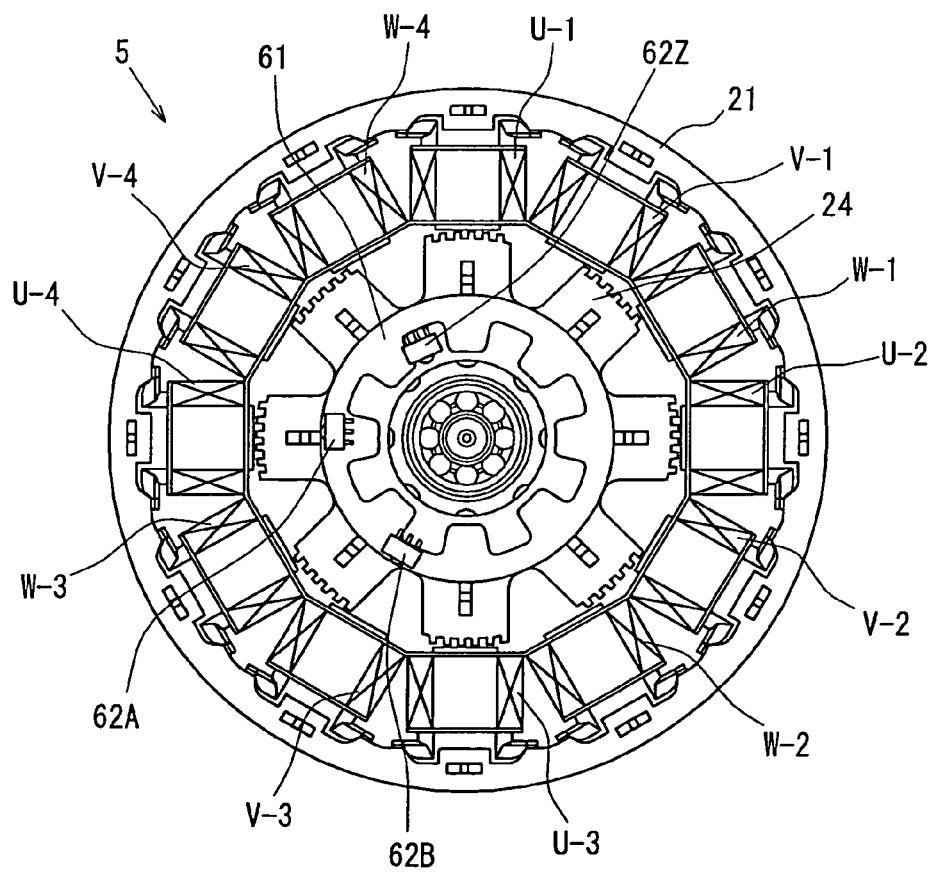
FIG. 13 is a schematic front view showing hall ICs provided to the electric motor, according to the first embodiment.

The rotor angle detecting unit 7 is a digital encoder that outputs pulses corresponding to the rotation of the rotor 11. Specifically, the rotor angle detecting unit 7 is an incremental type encoder that counts the number of pulses for detecting the number of rotation of the rotor 11 and the rotation angle of the rotor 11. The rotor angle detecting unit 7 includes a magnet 61 and a hall IC 62. The magnet 61 rotates integrally with the rotor 11. The hall IC 62 is arranged in the rear housing 20 for detecting magnetism. As shown in FIG. 13, the hall IC 62 includes a first rotation angular hall IC 62A, a second rotation angular hall IC 62B, and an index hall IC 62Z. The hall IC 62 is supported by a substrate 63 (FIG. 3) mounted in the rear housing 20.

As shown in FIGS. 10A to 12, the magnet 61 is in a substantially annular disc shape, and is arranged coaxially with respect to the rotor shaft 13. The magnet 61 connects with the axial end surface on the rear side of the rotor core 14.

Figure 12:
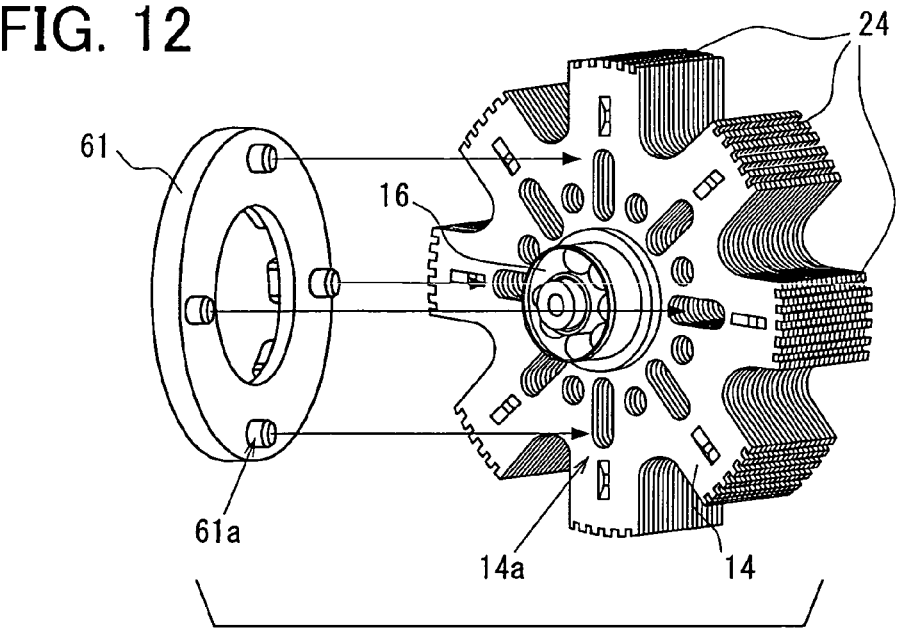
FIG. 12 is an exploded perspective view showing the rotor and the magnet, according to the first embodiment.

As shown in FIG. 12, the rear surface of the rotor core 14 has multiple holes 14a for alignment of the magnet 61. The magnet 61 has a connecting surface, on which multiple protrusions 61a are provided. The protrusions 61a of the magnet 61 are inserted into the corresponding holes 14a of the rotor core 14, so that the magnet 61 is assembled to the rotor core 14 such that the magnet 61 is substantially coaxial with respect to the rotation center of the rotor core 14.

Figure 11:
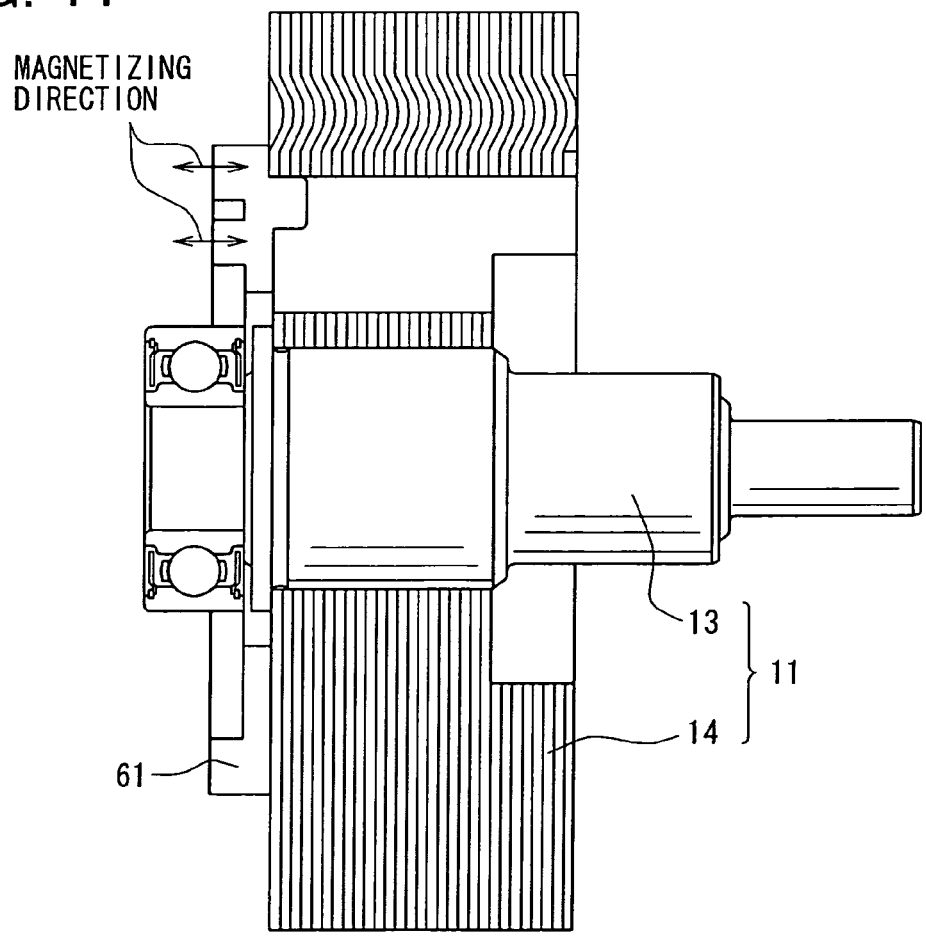
FIG. 11 is a partially cross sectional side view showing a rotor with the magnet, according to the first embodiment.

As shown in FIG. 11, the magnet 61 has the rear end surface, which opposes to the hall IC 62 (FIG. 3). The rear end surface of the magnet 61 is magnetized for detecting the rotation angle and an index for a phase to be energized, thereby generating magnetism in the axial direction of the magnet 61.

Figure 10A:
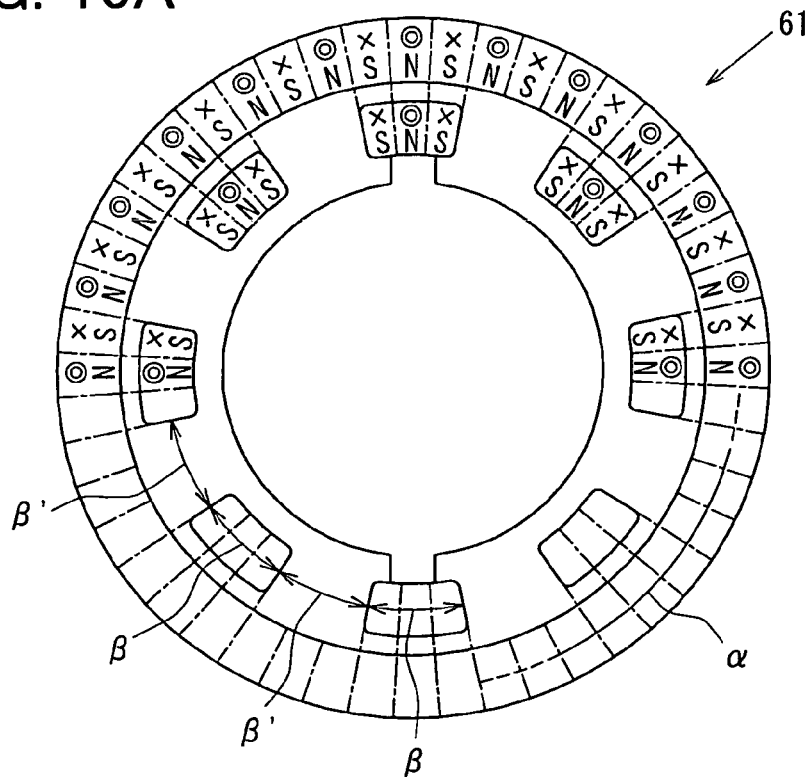
FIG. 10A is a front view showing a magnetized structure of a magnet.
Figure 10B:
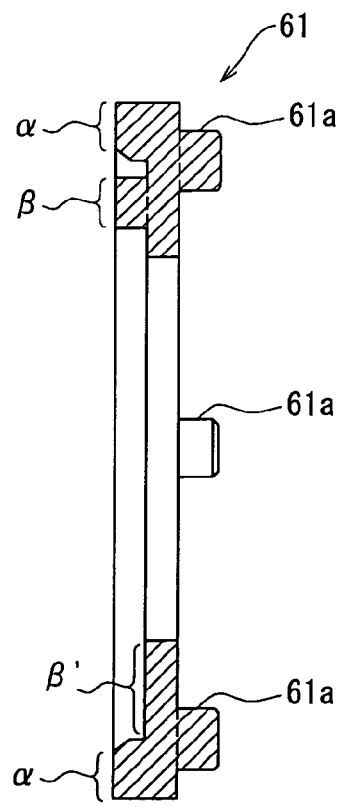
FIG. 10B is a cross sectional side view showing the magnet, according to the first embodiment.

Next, magnetized structure of the rear surface of the magnet 61 is described in reference to FIGS. 10A, 10B.

The magnet 61 has a rotation angular magnetized portion α on the rear surface thereof on the outer peripheral side thereof. The rotation angular magnetized portion α has multipolar magnetized portions along the rotative direction thereof for generating rotative angular signals and for terminating the rotative angular signals. Magnetized index portions β and non-magnetized index portions β' are provided to be adjacent to the inner periphery of the rotation angular magnetized portion α along the rotative direction of the magnet 61. The magnetized index portions β generate the index signals and terminate the index signals. The non-magnetized index portions β' do not perform the operation of the generating the index signals.

The rotation angular magnetized portion α has multipolar magnetized portions along the rotative direction thereof for generating rotative angular signals, which includes A-phase signals and B-phase signals. In the structure of the rotation angular magnetized portion α shown in FIG. 10A, the portion (north pole portion), which generates the magnetism (north pole magnetism) of the north pole, and the portion (south pole portion), which generates the magnetism (south pole magnetism) of the south pole, are alternatively arranged at intervals of substantially 7.5°, for example. Specifically, the rotation angular magnetized portion α has 48 poles of A-phase sensing portions and B-phase sensing portions, for example.

The magnetized index portions β respectively generate index signals (Z-phase signal) at intervals of 45°, for example. The coil device 22 of the U-phase, V-phase, and W-phase make around at the intervals of 45°, for example. Each of the magnetized index portions β includes the portion (north pole portion) magnetized to generate the north pole magnetism for a range of 7.5°. Portions (south pole portion) magnetized to generate the south pole magnetism are arranged on both sides of the north pole portion along the rotative direction, in each of the magnetized index portions β.

Each of the non-magnetized index portions β' is arranged between two magnetized index portions α, which are adjacent to each other along the rotative direction. Each non-magnetized index portion β' is not magnetized, so that the non-magnetized index portion β' does not generate the index signal.

The first and second rotation angular hall ICs 62A, 62B are supported by the substrate 63 in a condition, in which the first and second rotation angular hall ICs 62A, 62B respectively oppose to the rotation angular magnetized portion α in the axial direction. The index hall IC 62Z is supported by the substrate 63 in a condition, in which the index hall IC 62Z opposes to the magnetized index portions β and non-magnetized index portions β' in the axial direction.

The position of the first rotation angular hall IC 62A on the substrate 63 and the position of the second rotation angular hall IC 62B on the substrate 63 are distant from each other relatively for substantially 3.75°, for example (for substantially 90° in an electric angle, for example, as shown in FIG. 14).

Therefore, the A-phase signal and the B-phase signal are distant from each other relatively for substantially 3.75°, for example (for substantially 90° in an electric angle, for example).

A hall element and an ON-OFF signal generating IC are integrated to construct the first and second rotation angular hall ICs 62A, 62B and the index hall IC 62Z. The hall element generates a signal in accordance with an amount of magnetic flux passing through the hall element.

When magnetic flux on the side of the north pole applied to the hall element becomes greater than a threshold, the ON-OFF signal generating IC turns the rotation angular signals ON. That is, the ON-OFF signal generating IC generates the A-phase signal, B-phase signal, and Z-phase signal. When the magnetic flux, which is on the side of the south pole and is applied to the hall element, becomes greater than a threshold, the ON-OFF signal generating IC, turns the rotation angular signals OFF. That is, the ON-OFF signal generating IC terminates generating the A-phase signal, B-phase signal, and Z-phase signal.

In this embodiment, the hall ICs 62A, 62B, and 62z, in which the hall elements are integrated with ON-OFF signal generating IC, are described as an example. However, the hall element may be provided individually from the ON-OFF signal generating IC. Specifically, the ON-OFF signal generating IC may be assembled on the substrate 63 separately from the hall element. The ON-OFF signal generating IC may be assembled into the motor control device 9.

Figure 14A:
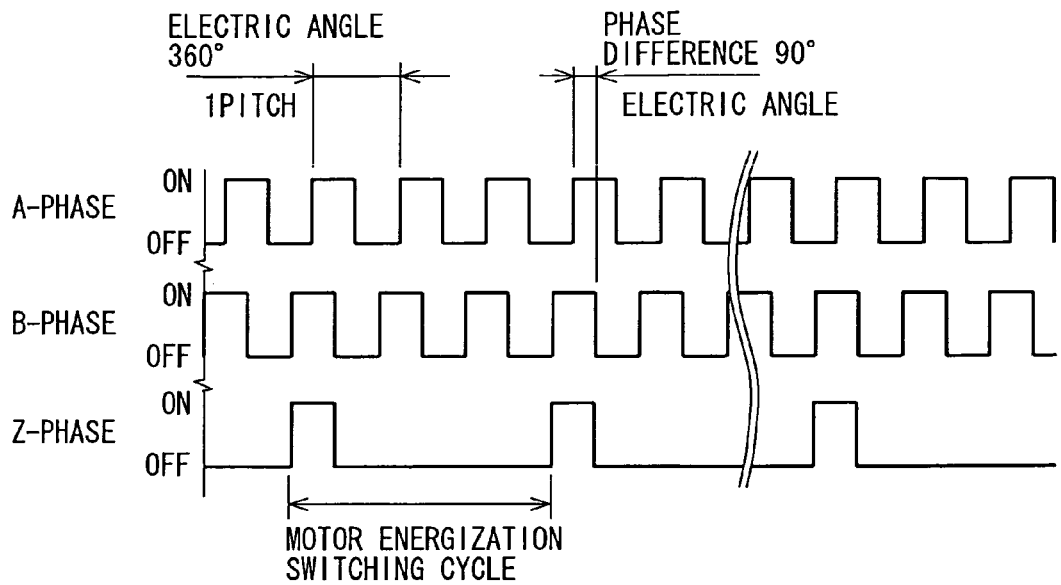
FIGS. 14A and 14B are waveform charts showing output signals of A-phase, B-phase, and Z-phase of the electric motor when the rotor rotates, according to the first embodiment.
Figure 14B:
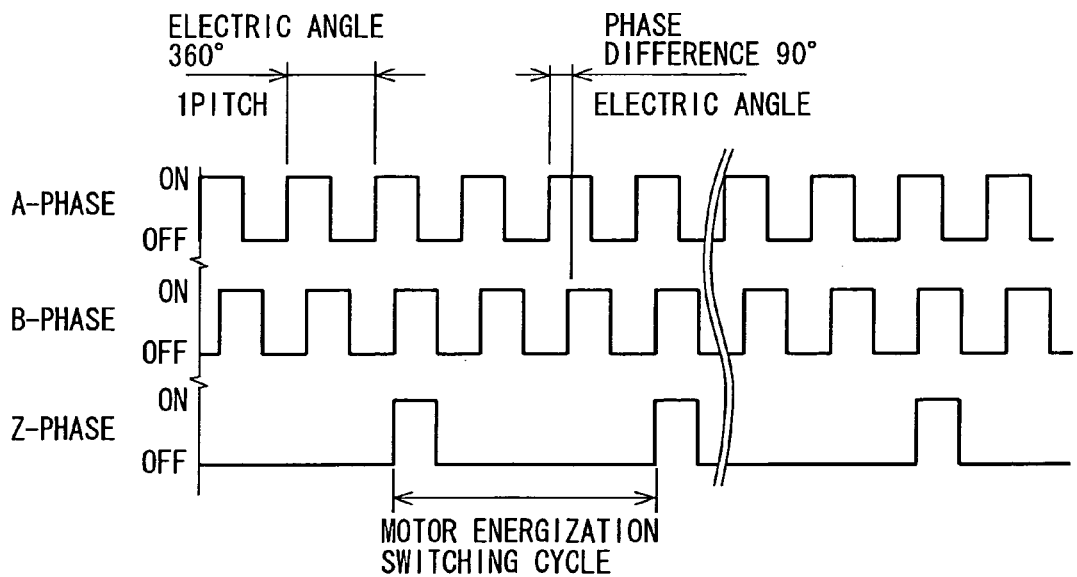
Figure 15:
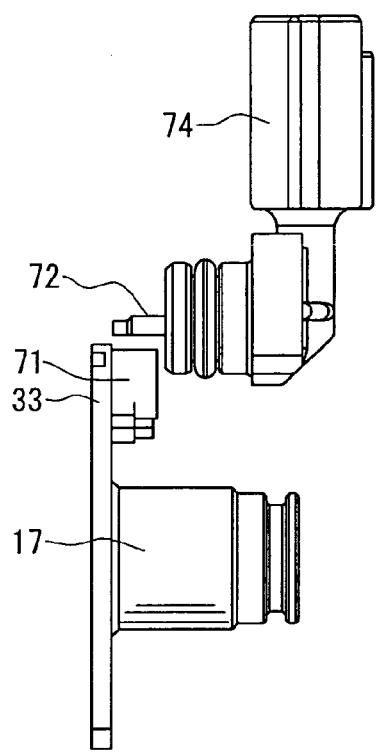
FIG. 15 is a side view showing the output angle detecting unit according to the first embodiment.
Figure 16:
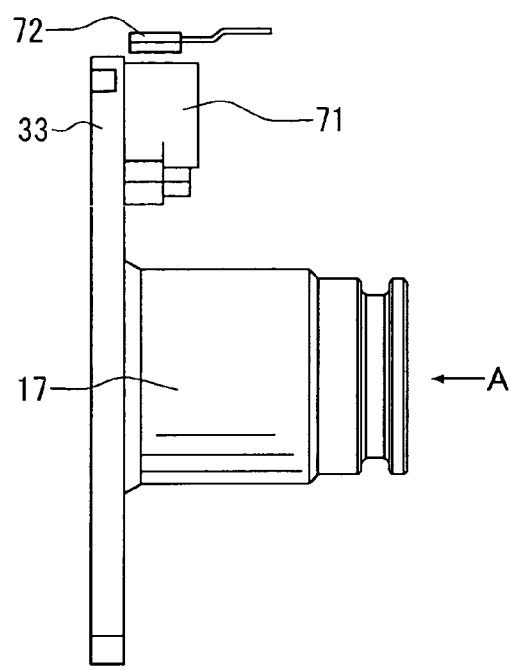
FIG. 16 is a side view showing a linear output hall IC of the output angle detecting unit, according to the first embodiment.

Next, output waveforms of the A-phase signal, B-phase signal, and Z-phase signal generated using the rotor angle detecting unit 7 are described in reference to FIGS. 14A, 14B.

The A-phase signal has a phase difference with respect to the B-phase signal relatively for substantially 3.75° (for substantially 90° in an electric angle), for example. In this embodiment, the A-phase signal and the B-shape signal are output respectively for one period at every rotation of substantially 15° of the rotor 11, for example.

The Z-phase signal is the index signal that is output once at every rotation of substantially 45° of the rotor 11, for example. The index signal is used for switching energization of the motor. The index signal is an ON signal in this embodiment, for example. The phase of energization of the electric motor 5 and a physical relationship of the A-phase with respect to the B-phase can be defined by this Z-phase signal.

The substrate 63 supports the first and second rotation angular hall ICs 62A, 62B, which axially oppose to the rotation angular magnetized portion α. The substrate 63 supports the index hall IC 62Z, which axially oppose to both the magnetized index portions β and non-magnetized index portions β'. The substrate 63 is accommodated in the rear housing 20. The substrate 63 is mounted to the lateral surface of the coil device 22 on the rear side.

Next, the output angle detecting unit 8 is described in reference to FIGS. 3, 15 to 18. The electric actuator 1 includes the output angle detecting unit 8 that detects angle (output angle) of the output shaft 17. The motor control device 9 detects the actual shift range such as P, R, N, and D, which are set using the shift range switching device 3, in accordance with the angle of the output shaft 17. The angle of the output shaft 17 is detected using the output angle detecting unit 8.

Figure 17:
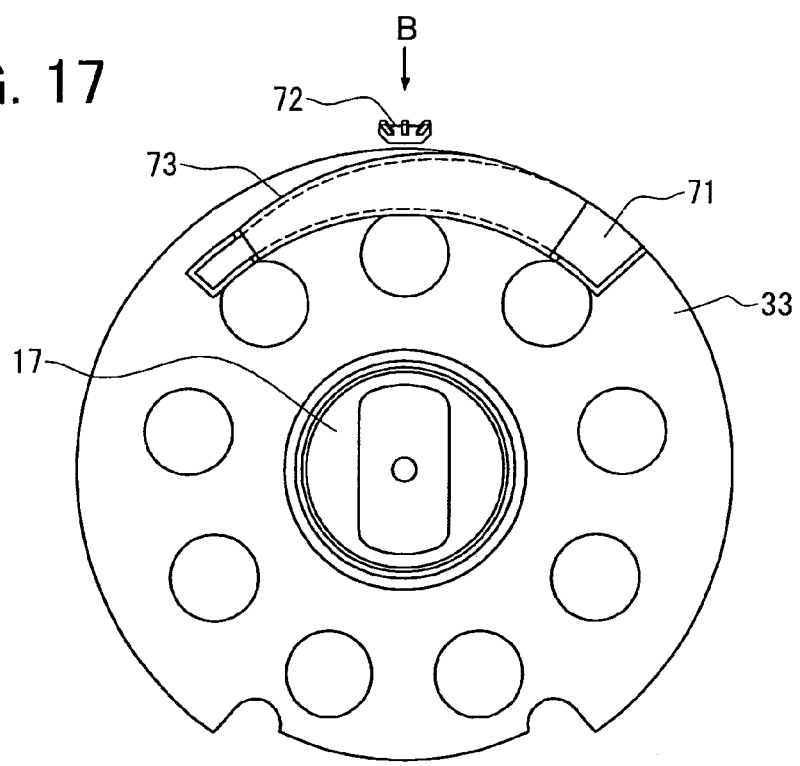
FIG. 17 is a front view when being viewed from the arrow A in FIG. 16.

The output angle detecting unit 8 serves as an analog magnetic sensor that detects magnetism, which corresponds to the angle of the output shaft 17, so that the output angle detecting unit 8 outputs an analog signal corresponding to the magnetism. The output angle detecting unit 8 detects the angle of the output shaft 17 as a continuous quantity. Specifically, in this embodiment, the output angle detecting unit 8 is constructed of a magnet 81 and a linear output hall IC 72. The magnet 71 is fixed to the front surface of the flange 33 that rotates integrally with the output shaft 17. As shown in FIG. 17, the magnet 71 is in a substantially crescentic form when being viewed in the axial direction of the output shaft 17. The magnet 71 is molded in a resinous member 73. The magnet 71 is magnetized along the arrow B depicted in FIG. 17 such that magnetic flux generated using the magnet 71 crosses the linear output hall IC 72 along the arrow B. The distance between the magnet 71 and the linear output hall IC 72 changes within the rotative range of the output shaft 17 corresponding to the shift ranges of the automatic transmission 2. Thus, the density of the magnetic flux passing through the linear output hall IC 72 changes.

Specifically, in this embodiment, the distance between the linear output hall IC 72 and the magnet 71 becomes substantially maximum when the output shaft 17 rotates to the position, which corresponds to the D range of the actual shift range. In this condition, the density of the magnetic flux passing through the linear output hall IC 72 becomes substantially minimum. By contrast, the distance between the linear output hall IC 72 and the magnet 71 becomes substantially minimum when the output shaft 17 rotates to the position, which corresponds to the P range of the actual shift range. In this condition, the density of the magnetic flux passing through the linear output hall IC 72 becomes substantially maximum.

Figure 18:
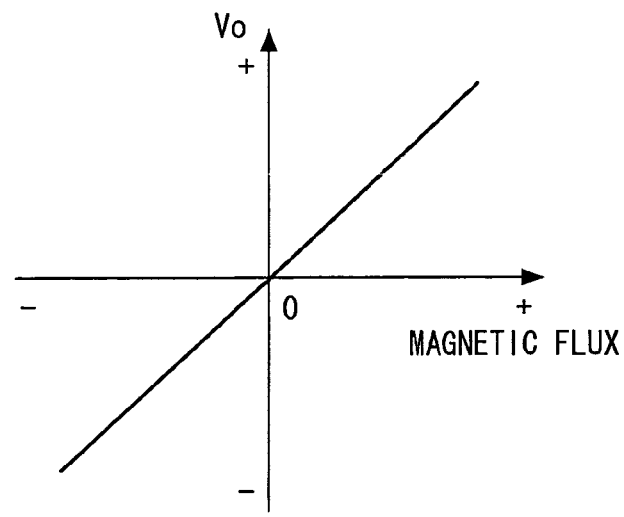
FIG. 18 is a graph showing a relationship between an amount of magnetic flux passing through the linear output hall IC and output voltage of the linear output hall IC, according to the first embodiment.

The linear output hall IC 72 is assembled to a resinous connector 74. The linear output hall IC 72 has a hall element that generates output voltage corresponding to the density of the magnetic flux passing through the linear output hall IC 72. As shown in FIG. 18, the output voltage Vo of the hall element of the linear output hall IC 72 becomes large, as the density of the magnetic flux passing through the linear output hall IC 72 increases.

In this structure, the angle of the output shaft 17 can be detected in accordance with the output voltage Vo of the hall element of the linear output hall IC 72. Therefore, the actual shift range, which corresponds to the angle of the output shaft 17, can be detected by sensing the output voltage Vo of the hall element of the linear output hall IC 72.

Figure 2:
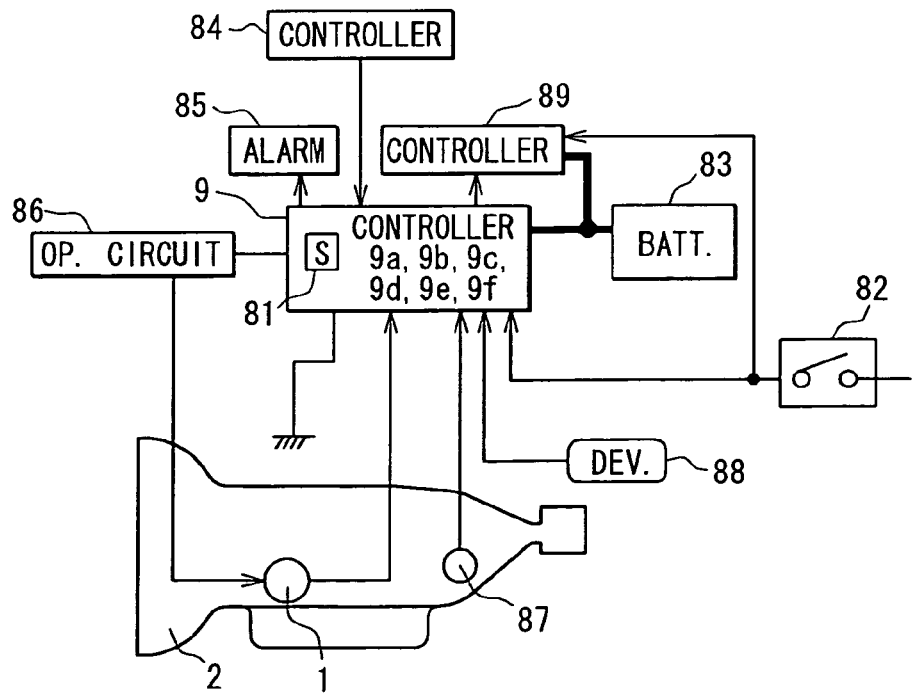
FIG. 2 is a schematic diagram showing a system of a shift range switching device according to the first embodiment.

Next, the motor control device (controller) 9 is described in reference to FIG. 2.

The motor control device 9 controls electricity supplied to the electric motor 5. The motor control device 9 is a microcomputer including a CPU, a storage unit (memory) 81, an input circuit, an output circuit, an electric power source, and the like. The CPU executes control processings and arithmetic processings. The storage unit 81 stores programs and data.

The motor control device 9 is electrically connected with devices such as a start switch (ignition switch, accessory switch) 82, an in-vehicle battery 83, a hydraulic controller 84, an indicating and alarm unit 85, a coil operating circuit 86 of the electric motor 5, and a vehicular speed sensor 87, and devices 88. The hydraulic controller 84 controls engaging condition of a hydraulic clutch. The indicating and alarm unit 85 depicts information such as a condition of the automatic transmission 2, e.g., the actual shift range of the automatic transmission 2. The indicating and alarm unit 85 may include an indicator, an alarm lamp, an alarm message device. The devices 88 may include a switch or a sensor for a shift range operating unit manipulated by the driver. The devices 88 may include a sensor for detecting a vehicular condition such as a position of a brake switch.

When the start switch 82 is turned ON, the battery 83 supplies electricity to the motor control device 9, so that the motor control device 9 performs various control processings. When the start switch 82 is turned OFF, the battery 83 stops supplying electricity to the motor control device 9, after performing a predetermined power OFF processing. That is, electricity supply is started by turning the start switch 82 ON, and electricity supply is terminated by turning the start switch 82 OFF. A body device controller 89 controls body devices provided to the vehicular body. The body devices include doors such as an electric slide door, a trunk opener, a power tailgate, and a fuel cap.

Next, the coil operating circuit 86 is described in reference to FIG. 6. The electric motor 5 is constructed by connecting the coils U, V, and W respectively in a manner of the star connection. The coil operating circuit 86 includes switching elements 86a, via which electricity is supplied to each of the coils U, V, and W. The motor control device 9 turns the switching elements 86a ON and OFF, so that supplying electricity to the coils U, V, and W is switched.

Figure 19A:
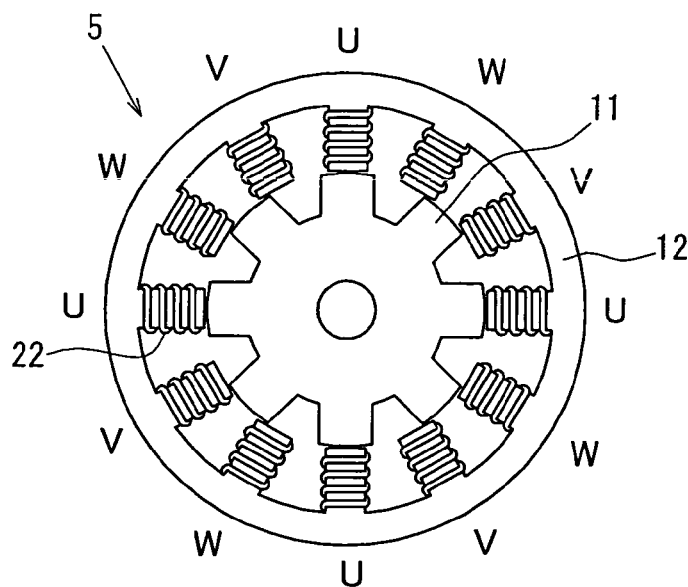
FIG. 19A is a schematic view showing an electric motor.
Figure 19B:
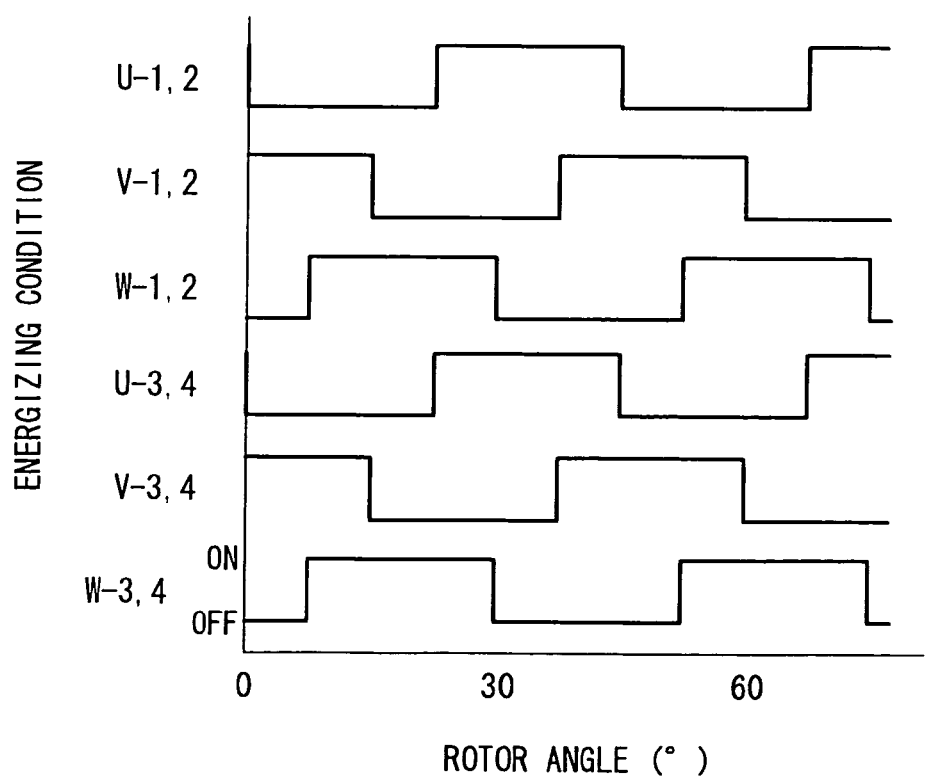
FIG. 19B is a graph showing a relationship between the rotor angle and energizing conditions of coils, according to the first embodiment.

As shown in FIGS. 19A, 19B, when the rotor 11 is rotated, the switching elements 86a is turned ON and OFF in accordance with the rotor angle of the rotor 11, which is detected using the rotor angle detecting unit 7, and a correction term for compensating delay in excitation. Thus, supplying electricity to the coils U, V, and W of the coil device 22 is switched, so that the rotor 11 is rotated. Alternatively, an open control may be conducted in the switching operation of supplying electricity to the coils U, V, and W of the coil device 22 regardless of the detection signal of the rotor angle of the rotor 11.

The motor control device 9 includes various control programs such as a rotor angle processing unit, an output angle processing unit, and a motor control unit.

The rotor angle processing unit arithmetically processes the rotative direction of the rotor 11, the rotation speed of the rotor 11, the rotation amount of the rotor 11, and the rotation angle of the rotor 11, in accordance with the output signals of the rotor angle detecting unit 7. The output signals of the rotor angle detecting unit 7 include digital signals output from the first and second rotation angular hall ICs 62A, 62B, and the index hall IC 62Z. The output angle processing unit arithmetically processes the angle of the output shaft 17 in accordance with the output signal of the output angle detecting unit 8. Specifically, the output signals of the output angle detecting unit 8 is the analog signal of the linear output hall IC 72. The motor control unit controls the electric motor 5 such that a command signal of the shift range operating unit coincides with the actual shift range detected and recognized by the motor control device 9.

When a deviation exists between a target shift range and the actual shift range, the motor control unit controls an operation of the electric motor 5. The target shift range is equivalent to the command signal of the shift range operating unit. The actual shift range is detected using the output angle detecting unit 8, so that the motor control device 9 recognizes the actual shift range. More specifically, the motor control unit determines the rotative direction of the electric motor 5, the rotation speed of the electric motor 5, the rotation amount of the electric motor 5, and the rotation angle of the electric motor 5, in accordance with the deviation between the target shift range and the actual shift range. Thus, the motor control unit controls the operation of the electric motor 5 such that the target shift range coincides with the actual shift range. The motor control unit terminates supplying electricity to the electric motor 5 after the target shift range coincides with the actual shift range.

Figure 20A:
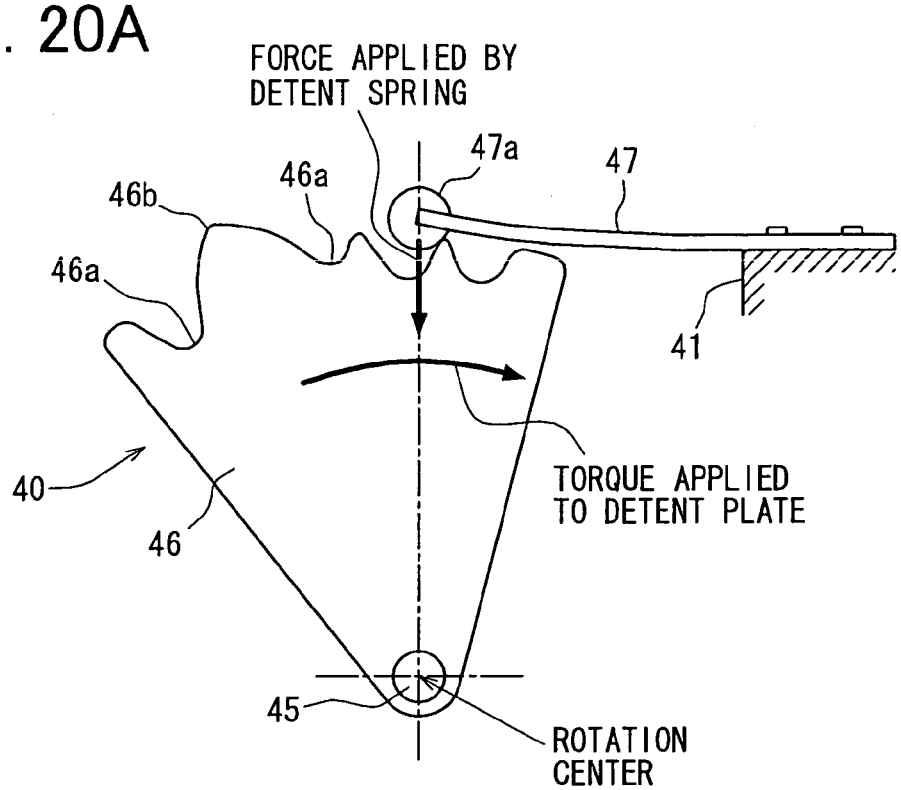
FIGS. 20A, 20B are side views showing a detent device according to the first embodiment.
Figure 20B:
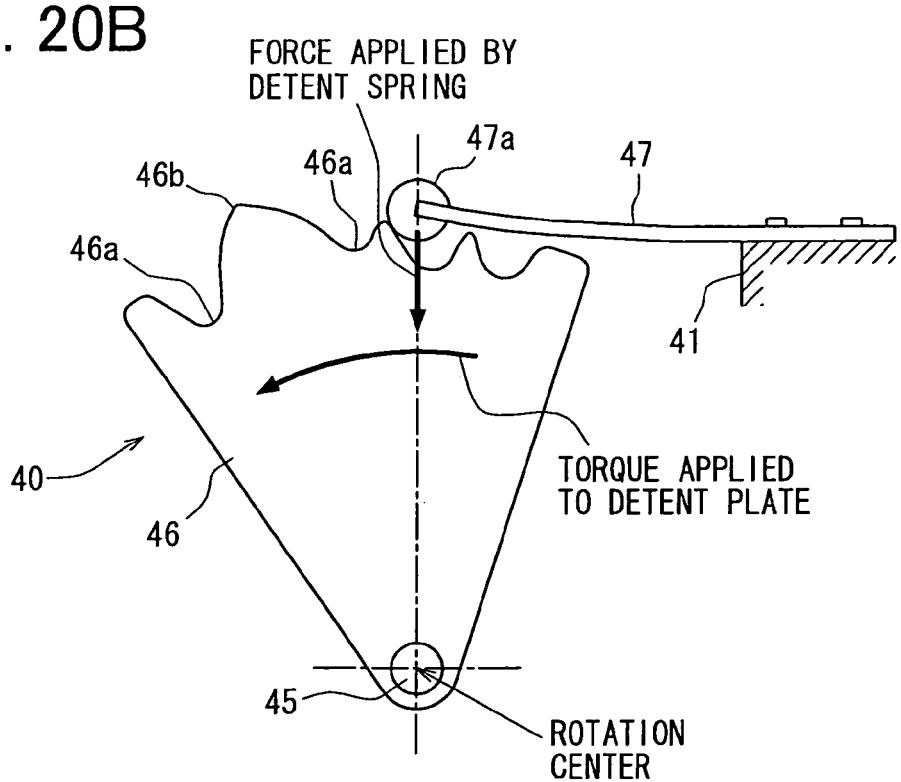

Next, a detent device 40 provided to the shift range switching device 3 is described in reference to FIGS. 20A, 20B. The detent device 40 maintains the angular position of the detent plate 46 corresponding to one of the shift ranges.

In this embodiment, the detent device 40 is constructed of the detent plate 46 (first member) and the detent spring 47 (second member). The detent plate 46 has multiple detent grooves 46a respectively corresponding to the shift ranges. The detent spring 47 is constructed of a blade spring. The detent spring 47 includes the hooking portion 47a at the tip end thereof. The hooking portion 47a engages with one of the detent grooves 46a. The detent spring 47 is fixed to the hydraulic valve body 41.

Each of the detent grooves 46a is a recession formed in the radially outer tip end of in the arc portion being in a sector shape. The hooking portion 47a of the detent spring 47 engages with one of the detent grooves 46a, so that the shift range is maintained.

The detent plate 46 is in a shape having a curved line defining the detent groove 46a such that engagement between the hooking portion 47a and the detent groove 46a can be released by rotating the detent plate 46. The hooking portion 47a of the detent spring 47 is pressed toward the bottom of the detent groove 46a, i.e., toward the rotation center of the detent plate 46 by bias force of the detent spring 47. Therefore, when the hooking portion 47a is distant from the lowest bottom point of the detent groove 46a, the hooking portion 47a applies force to the detent plate 46 such that the hooking portion 47a moves toward the lowest bottom point of the detent groove 46a.

As referred to FIG. 20A, the hooking portion 47a makes contact with the detent groove 46a via a contact point, which is distant from the lowest bottom point of the detent groove 46a toward the D range on the right side in FIG. 20A. In this condition, the hooking portion 47a applies force to the detent plate 46 such that the detent plate 46 rotates clockwise in FIG. 20A by bias force of the detent spring 47.

By contrast, as referred to FIG. 20B, the hooking portion 47a makes contact with the detent groove 46a via a contact point, which is distant from the lowest bottom point of the detent groove 46a toward the P range on the left side in FIG. 20A. In this condition, the hooking portion 47a applies force to the detent plate 46 such that the detent plate 46 rotates anticlockwise in FIG. 20B, by bias force of the detent spring 47.

When the motor control device 9 terminates supplying electricity to the electric motor 5 of the electric actuator 1 after completion of switching the shift range, the detent plate 46 of the detent device 40 stops at a terminating position, at which the motor control device 9 terminates supplying electricity. The detent device 40 becomes stable at a detent stable position, in which the hooking portion 47a makes contact with the lowest bottom point of the detent groove 46a. The terminating position needs to substantially coincide with the detent stable position so as to stabilize the position of the detent plate 46, when the motor control device 9 terminates supplying electricity to the electric motor 5 after completion of switching the shift range. That is, the motor control device 9 needs to accurately control the rotation amount and the rotation angle of the electric motor 5 in order to control the rotation of the detent plate 46.

The output shaft 17 connects with the detent plate 46 via a power transmission system that has mechanical clearance. Specifically, the output shaft 17 and the detent plate 46 have a clearance therebetween. The clearance restricts the output shaft 17 and the detent plate 46 from causing abrasion. In addition, the electric actuator 1 can be smoothly assembled to the shift range switching device 3 via the clearance between the output shaft 17 and the detent plate 46. However, the clearance causes mechanical backlash and play between the output shaft 17 and the detent plate 46. The backlash and play are caused in a connecting portion between the output shaft 17 (FIG. 8) of the electric actuator 1 and the control rod 45 (FIG. 4) of the shift range switching device 3. The output shaft 17 is enagged with the control rod 45 via spline grooves that axially extend in this connecting portion. Therefore, this connecting portion, in which the output shaft 17 connects with the control rod 45, causes mechanical backlash and play with respect to the radial direction thereof. Thus, the output angle of the output shaft 17 and an actual plate angle of the detent plate 46 cause a deviation due to the backlash and play.

In view of the deviation, the control amount of the electric motor 5 needs to be determined in consideration of, i.e., by incorporating the clearance between the output shaft 17 and the detent plate 46 in order to accurately control the detent plate 46. However, components constructing the shift range switching device have manufacturing tolerance. In addition, the dimensions and properties of the components vary due to abrasion. Accordingly, backlash and play of the components are not uniform. As a result, it is difficult to accurately control the position of the detent plate 46.

The shift range switching device includes the below structure.

The detent device 40 includes the detent plate (first member) 46 that is movable relative to the detent spring (second member) 47. The detent plate 46 is mechanically maintained by engaging the hooking portion 47a with one of the detent grooves 46a defining multiple detent positions of the detent plate 46, so that the shift range can be mechanically maintained.

The electric actuator 1 includes the electric motor 5 and the reduction gears 6, via which the electric actuator 1 operates the detent plate 46. The motor control device 9 controls supplying electricity to the electric motor 5 to rotate the detent plate 46 for switching the actual shift range. The rotor angle detecting unit 7 detects the rotor angle of the rotor 11 of the electric motor 5. The output angle detecting unit 8 detects the output angle of the output shaft 17.

In view of the foregoing problems, in this embodiment, the shift range switching device includes the below structure.

Figure 1:
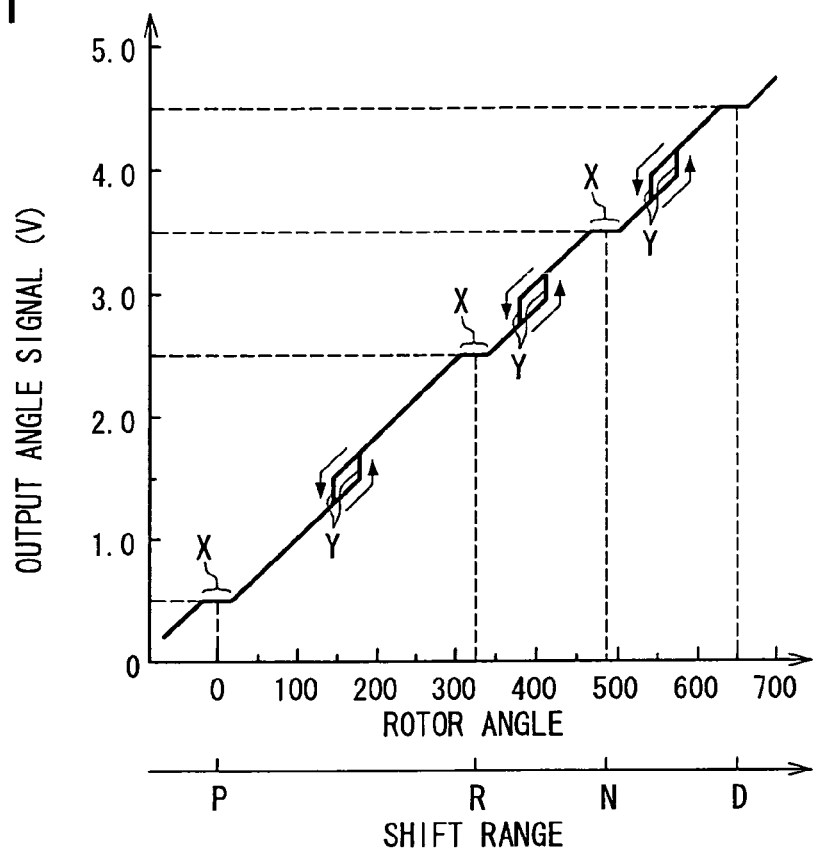
FIG. 1 is a graph showing a relationship between a rotor angle detected using a rotor angle detecting unit and an output angle detected using an output angle detecting unit, according to a first embodiment.

The motor control device 9 includes a backlash calculating unit 9a that calculates an amount (backlash amount) of backlash and play caused between the rotor 11 and the detent plate 46 in accordance with a range of the rotor angle in a region X (first region) in FIG. 1. In this region X, change in the output angle detected using the output angle detecting unit 8 with respect to change in the rotor angle detected using the rotor angle detecting unit 7 becomes small.

The motor control device 9 includes a backlash storing unit 9b that stores the backlash amount, which is calculated using the backlash calculating unit 9a, in the storage unit 81.

The motor control device 9 includes a backlash correcting unit that controls rotation of the electric motor 5 in consideration of, i.e., by incorporating the backlash amount stored in the storage unit 81.

Next, the backlash calculating unit 9a is described. As shown in FIG. 20A, the hooking portion 47a makes contact with the detent groove 46a via the contact point, which is distant from the lowest bottom point of the detent groove 46a toward the D range on the right side in FIG. 20A. In this condition, the hooking portion 47a applies force to the detent plate 46 such that the detent plate 46 rotates clockwise in FIG. 20A, by bias force of the detent spring 47. The output shaft 17 engages with the detent plate 46 on one side of a backlash range. In this condition, backlash is to be eliminated toward the forward side.

By contrast, as referred to FIG. 20B, the hooking portion 47a makes contact with the detent groove 46a via a contact point, which is distant from the lowest bottom point of the detent groove 46a toward the P range on the left side in FIG. 20A. In this condition, the hooking portion 47a applies force to the detent plate 46 such that the detent plate 46 rotates anticlockwise in FIG. 20B, by bias force of the detent spring 47. The output shaft 17 engages with the detent plate 46 on the other side of the backlash range. In this condition, backlash is to be eliminated toward the reverse side.

Force is applied to the hooking portion 47a of the detent spring 47 such that the hooking portion 47a engages with the lowest bottom point of the detent groove 46a, so that the detent plate 46 is apt to stop at the position, in which the hooking portion 47a engages with the lowest bottom point of the detent groove 46a. The output shaft 17 is movable by the backlash amount, even in the condition, in which the detent plate 46 stops. That is, as shown in FIG. 1, when the hooking portion 47a is around the lowest bottom point of the detent groove 46a, the rotor angle detected using the rotor angle detecting unit 7 varies by the backlash amount, even the output angle detected using the output angle detecting unit 8 does not change.

The backlash calculating unit 9a calculates the backlash amount in accordance with the above properties. Specifically, the backlash calculating unit 9a calculates the range (region X) of the rotor angle as the backlash amount. In the range (region X) of the rotor angle, an output gain of the output angle detecting unit 8 with respect to increase and decrease in the rotor angle becomes equal to or less than a predetermined amount. In this embodiment, a simplified example is described. In this simplified example, the backlash amount is set to be equal to the range of the rotor angle in the region X in order to include the backlash amount directly into the control amount of the electric motor 5. However, the backlash amount between the output shaft 17 and the detent plate 46 may be accurately calculated by multiplying the range of the rotor angle in the region X by a reduction ratio K of the reduction gears.

The backlash calculating unit 9a may calculate the backlash amount at various timings such as when the storage unit 81 does not store the backlash amount, when a predetermined time elapses, when the vehicle travels for every 10 thousand kilometers, and every time when the motor control device 9 is operated.

The backlash storing unit 9b stores the backlash amount calculated using the backlash calculating unit 9a in the storage unit 81. The backlash amount stored in the storage unit 81 may be revised as appropriate. The backlash amount stored in the storage unit 81 may be averaged using a learning function.

The storage unit 81 is provided in the motor control device 9. Specifically, the storage unit 81 may be an EEPROM, which is capable of storing the backslash mount even when supplying electricity to the motor control device 9 is terminated. Alternatively, the storage unit 81 may be an SRAM that is capable of storing the backslash amount by being supplied with a small amount of electricity, after terminating supplying electricity to the motor control device 9. When an EEPROM is provided as the storage unit 81, supplying electricity to the motor control device 9 can be completely terminated when the vehicle is parked. When an SRAM is provided as the storage unit 81, the SRAM is supplied with slight electricity for maintaining storage of the backlash amount in the motor control device 9 while parking the vehicle. Even in this structure, energy consumption of the motor control device 9 can be reduced while parking the vehicle.

The backlash correcting unit controls the rotation of the electric motor 5 in consideration of the backlash amount stored in the storage unit 81 when the motor control device 9 controls the rotation of the electric motor 5 to switch the shift range. Specifically, the backlash correcting unit sets a target value of the rotation angle of the electric motor 5. That is, the backlash correcting unit sets a target output angle of the output shaft 17. More specifically, the backlash correcting unit sets the target output angle at a position, which is set back from an end position of the backlash range by substantially half of the backlash range. Alternatively, the backlash correcting unit sets the target output angle at a position, which is set back from the end position of the backlash range for a predetermined percentage of the backlash range.

In this embodiment, the motor control device 9 calculates the mechanical backlash amount arising between the rotor 11 and the detent plate 46. Furthermore, the motor control device 9 controls the rotation of the electric motor 5 in consideration of, i.e., by incorporating the backlash amount. That is, the motor control device 9 is capable of controlling the rotation of the detent plate 46 by incorporating the calculated backlash amount additionally to the control amount of the electric motor 5. Thus, the motor control device is capable of accurately controlling the position of the detent plate 46.

In this embodiment, the motor control device 9 includes a failure indicating function that is capable of indicating and notifying a failure to a driver using an indication and alarm unit 85 when the backlash amount, which is calculated using the backlash calculating unit 9a, becomes greater than a predetermined threshold.

Thus, the motor control device 9 is capable of indicating failure and abnormality to the driver in a condition, in which the backlash amount becomes to be greater than the threshold due to ablation, and in a condition, in which the power transmission between the rotor 11 and the detent plate 46 causes an unpredictable abnormality. Therefore, the motor control device 9 is capable of urging the driver to conduct initial treatment for the failure and abnormality.

In this embodiment, the motor control device 9 includes an actual switching evaluating unit 9c that detects switching of the detent, which corresponds to the actual shift range, in accordance with a range of the output angle in a region Y (second region) in FIG. 1. In this region Y, change in the output angle becomes large with respect to change in the rotor angle.

The motor control device 9 includes a switching position recognizing unit 9d that recognizes the switching position of the detent, which corresponds to the actual shift range, in accordance with a number of switching the detent detected using the actual switching evaluating unit 9c.

When the actual shift range is switched, the hooking portion 47a of the detent spring 47 climbs over a top portion 46b between the detent grooves 46a, which are adjacent to each other. The hooking portion 47a of the detent spring 47 is applied with force such that the hooking portion 47a moves toward the lowest bottom portion of the detent groove 46a. Therefore, when the hooking portion 47a climbs over the top portion 46b, the detent plate 46 rotates for the backlash amount, even when the output shaft 17 stops.

That is, as referred to FIG. 1, when the hooking portion 47a climbs over the top portion 46b, the output angle, which is detected using the output angle detecting unit 8, changes for the backlash amount, even in a condition, in which the rotor angle, which is detected using the rotor angle detecting unit 7, does not change.

The output angle changes for the backlash amount, even when the rotor angle does not change. As referred to FIG. 1, this output angle is displaced for the backlash amount with respect to the rotative direction of the detent plate, i.e., the rotative angle of the rotor 11, when the hooking portion 47a climbs over the top portion 46b.

The actual switching evaluating unit 9c evaluates switching of the detent, i.e., switching of the actual shift range by utilizing the above properties.

Specifically, the backlash calculating unit 9a evaluates that the hooking portion 47a climbs over the top portion 46b in the range (region Y) of the output angle, when the output gain of the output angle detecting unit 8 with respect to increase and decrease in the rotor angle becomes equal to or greater than a predetermined amount. Thus, the backlash calculating unit 9a detects switching of the actual shift range.

The switching position recognizing unit 9d evaluates the switching position of the present detent (actual shift range) in accordance with the number of switching the detent, which is equivalent to the number of switching the actual shift range and the number of passing through the region Y. More specifically, when the motor control device 9 rotates the electric motor 5 to the forward side, the motor control device 9 turns a flag ON every time when the output angle passes through the region Y. By contrast, when the motor control device 9 rotates the electric motor 5 to the reverse side, the motor control device 9 turns the flag OFF every time when the output angle passes through the region Y. Thus, the motor control device 9 determines the present actual shift range on the basis of the number of the flags, which are turned ON.

Thus, the motor control device 9 is capable of detecting the actual shift range, in addition to using the unit that calculates the actual shift range in accordance with the output angle of the output shaft 7. Therefore, accuracy of the detection of the actual shift range can be further enhanced, so that reliability of the detection can be further enhanced.

In this embodiment, as described above, the rotor angle detecting unit 7 is a digital encoder that outputs pulses in accordance with the rotation amount of the rotor 11. Furthermore, the output angle detecting unit 8 is an analog magnetic sensor that outputs an analog signal in accordance with the magnetism, which corresponds to the output angle of the output shaft 17.

The output angle detecting unit 8 utilizes change in magnetism applied from the magnet to the linear output hall IC 72. Accuracy of the output angle detected using the output angle detecting unit 8 depends on various parameters. The parameters include accuracy of magnetism generated from the magnet 71, change in magnetism of the magnet 71 corresponding to change in temperature, reduction in magnetism of the magnet 71 due to heat cycle, and accuracy of assembling the magnet 71. Accordingly, the output angle may drift when the output angle detecting unit 8 loses accuracy.

However, in this embodiment, the shift range switching device includes an analog output correcting unit 9e that corrects the analog signal output from the output angle detecting unit 8 in accordance with the region X and the region Y, which are distinctive regions. In the region X or the region Y, the output gain of the output angle detecting unit 8 becomes small or large with respect to increase and decrease in the rotor angle.

More specifically, the analog output correcting unit 9e corrects the analog output of the output angle detecting unit 8 in one of the shift ranges P, R, N, and D, each corresponding to the region X, such that the output gain of the output angle detecting unit 8 becomes a predetermined gain. In these shift ranges P, R, N, and D, the output gain of the output angle detecting unit 8 with respect to increase and decrease in the rotor angle becomes equal to or less than a predetermined amount.

Alternatively, the analog output correcting unit 9e corrects the analog output of the output angle detecting unit 8 in one of a position between the shift ranges P and R, a position between the shift ranges R and N, and a position between the shift ranges N and D, each corresponding to the region Y, in which the hooking portion 47a climbs over the top portion 46b. In these positions corresponding to the region Y, the analog output correcting unit 9e corrects the analog output of the output angle detecting unit 8 such that the output gain of the output angle detecting unit 8 becomes a predetermined gain. In these positions corresponding to the region Y, the output gain with respect to increase and decrease in the rotor angle becomes equal to or greater than a predetermined amount. The analog output correcting unit 9e corrects the analog output of the output angle detecting unit 8 in consideration of, i.e., by incorporating timing, in which a hysteresis is caused by backlash and play.

In this embodiment, the shift range switching device corrects the output gain of the output angle detecting unit 8 to the predetermined gain in accordance with the region X and the region Y, which are distinctive regions, in which the output angle distinctively changes with respect to increase and decrease in the rotor angle.

Thus, accuracy of detection of the output angle detecting unit 8 can be enhanced, even when properties of analog output of the analog magnetism sensor is degraded, due to accumulating parameters exerting bad influences to detection of the output angle detecting unit 8. The parameters may include accuracy of magnetism generated from the magnet 71, change in magnetism of the magnet 71 corresponding to change in temperature, reduction in magnetism of the magnet 71 due to heat cycle, and accuracy of assembling the magnet 71. Therefore, accuracy of detection of the output angle detecting unit 8 can be enhanced, even when the parameters are accumulated.

Second Embodiment

In the first embodiment, the motor control device 9 has the analog output correcting unit 9e that corrects the output gain of the output angle detecting unit 8 in accordance with the region X and the region Y, which are distinctive regions, in which the output angle with respect to increase and decrease in the rotor angle distinctively change.

By contrast, in this second embodiment, the motor control device 9 of the shift range switching unit includes the following output angle map correcting unit 9f, instead of the analog output correcting unit 9e in the first embodiment.

The output angle map correcting unit 9f corrects an output angle detection map in accordance with the region X and the region Y. The output angle detection map is used for calculating the output angle on the basis of the analog output of the output angle detecting unit 8. Specifically, the output angle map correcting unit 9f corrects the output angle detection map in accordance with the output angle in one of the shift ranges P, R, N, and D, each corresponding to the region X, such that a predetermined output angle is calculated on the basis of the analog output of the output angle detecting unit 8.

Alternatively, the analog output correcting unit 9e may correct the output angle detection map in accordance with the region Y, in which the hooking portion 47a climbs over the top portion 46b, such that a predetermined output angle is calculated on the basis of the analog output of the output angle detecting unit 8. The analog output correcting unit 9e corrects the output angle detection map in consideration of timings, in which a hysteresis is caused by backlash and play.

Even in this structure, accuracy of detection of the output angle detecting unit 8 can be enhanced, even when properties of analog output of the analog magnetism sensor is degraded due to accumulating parameters exerting bad influences to detection of the output angle detecting unit 8.

(Modification)

Figure 21:
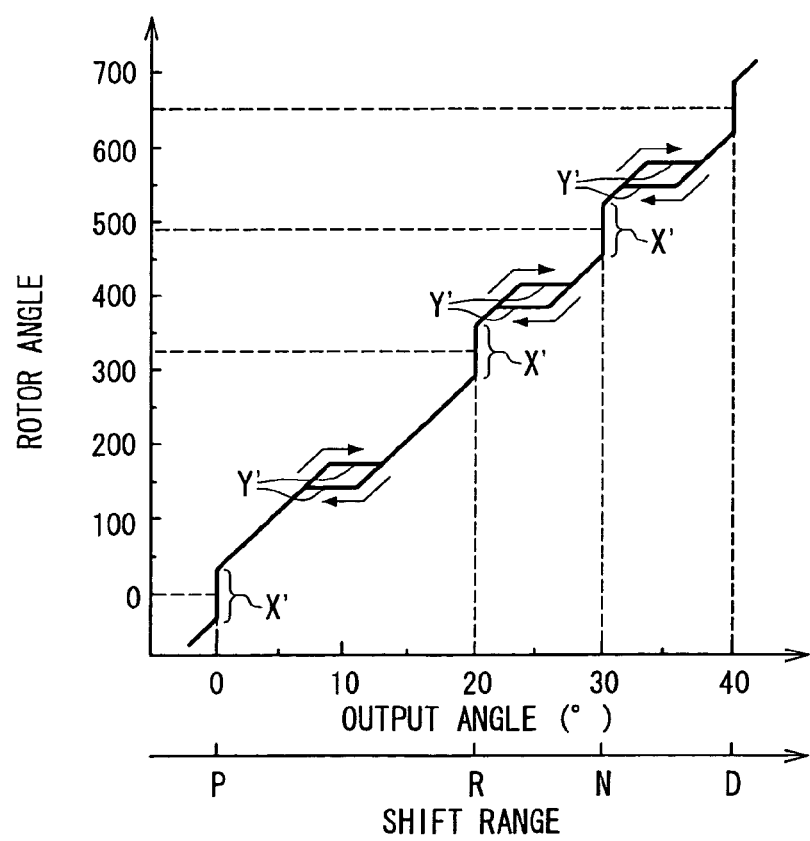
FIG. 21 is a graph showing a relationship between the rotor angle detected using the rotor angle detecting unit and the output angle detected using the output angle detecting unit, according to a modification embodiment.

As shown in FIG. 21, the rotor angle detected using the rotor angle detecting unit 7 distinctively changes with respect to increase and decrease in the output angle of the output angle detecting unit 8 in regions X', Y', which are distinctive regions. Specifically, the rotor angle largely changes in the regions X', and the rotor angle slightly changes in the regions Y'. The backlash amount may be calculated in accordance with the regions X', Y'. The detent may be switched in accordance with the regions X', Y'. The analog output of the output angle detecting unit 8 may be corrected in accordance with the regions X', Y'. The output angle detection map may be corrected in accordance with the regions X', Y'.

The electric motor 5 is not limited to the SR motor. The electric motor 5 may be various kinds of motors such as a reluctance motor and a permanent magnet synchronous motor. The reluctance motor my be a synchronous reluctance motor. The permanent magnet synchronous motor may be a surface permanent magnet synchronous motor (SPM), or an interior permanent magnet synchronous motor (IPM).

The number of the magnetic circuits of the electric motor 5 is not limited to two. The number of the magnetic circuits of the electric motor 5 may be at least three. The electric motor 5 may include one magnetic circuit.

The reduction gears 6 are not limited to the inscribed planetary reduction gear (cycloidal gears). A planetary reduction gear constructed of the sun gear 26, planetary pinions, a ring gear, and the like may be used as the reduction gears 6. The sun gear 26 is rotated by the rotor shaft 13. The planetary pinions are arranged along the circumferential periphery of the sun gear 26 at regular intervals. The ring gear engages with the circumferential periphery of the planetary pinion.

The reduction gears 6 may be constructed of the sun gear 26 and a gear train. The gear trains engage with the sun gear 26.

The above structure can be applied to various apparatuses such as industrial robots, each having a detent device 40. The above structure can be applied to any other apparatuses, each having a detent device 40 switched using an electric actuator 1.

Various modifications and alternations may be diversely made to the above embodiments without departing from the spirit of the present invention.

What is claimed is:

1. A switching controller comprising:
   a detent device that includes a first member and a second member, which are movable relative to each other, the second member being applied with bias force to mechanically engage with the first member at one of a plurality of detent positions defining relative positions between the first member and the second member;
   an electric actuator that includes an electric motor having a rotor, a reduction gear, and an output shaft, the electric motor rotating the rotor when being supplied with electricity, the reduction gear reducing rotation of the rotor and transmitting the rotation to the output shaft manipulating the first member;
   a main controller that controls the electric motor to switch the one of the plurality of detent positions;
   a rotor angle detecting unit that detects rotor angle of the rotor; and
   an output angle detecting unit that detects output angle of the output shaft,
   wherein the main controller includes a backlash calculating unit that calculates a backlash amount between the rotor and the first member in accordance with at least one of occurrence of a first region, in which change in the output angle is small with respect to change in the rotor angle, and a range of the rotor angle in the first region, and
   the main controller incorporates the backlash amount into the control of the electric motor.

2. The switching controller according to claim 1, wherein change in the rotor angle is large with respect to change in the output angle in the first region.

3. The switching controller according to claim 1,
   wherein the main controller further includes a storage unit,
   the main controller further includes a backlash storing unit that stores the backlash amount in the storage unit, and
   the main controller incorporates the backlash amount, which is stored in the storage unit, into the control of the electric motor.

4. The switching controller according to claim 1, further comprising:
   an indicating unit that indicates a failure state and notifies a passenger the failure state when the backlash amount is greater than a threshold.

5. The switching controller according to claim 1,
   wherein the storage unit is one of an EEPROM and an SRAM,
   the EEPROM stores the backlash amount when supplying electricity to the main controller is terminated, and
   the SRAM stores the backlash amount by being supplied with a small amount of electricity.

6. The switching controller according to claim 1, wherein the main controller includes an actual switching evaluating unit that detects switching of the one of the plurality of detent positions in accordance with at least one of occurrence of a second region, in which change in the output angle is large with respect to change in the rotor angle, and a range of the output angle in the second region.

7. The switching controller according to claim 6, wherein change in the rotor angle is small with respect to change in the output angle in the second region.

8. The switching controller according to claim 6, wherein the main controller includes a switching position recognizing unit that recognizes a present position of the plurality of detent positions in accordance with a number of switching the plurality of detent positions.

9. The switching controller according to claim 1,
   wherein the rotor angle detecting unit is a digital encoder that outputs a pulse corresponding to rotation of the rotor,
   the output angle detecting unit is an analog magnetic sensor that detects magnetism, which corresponds to the output angle of the output shaft, and outputs an analog signal in accordance with the magnetism,
   the main controller further includes an analog output correcting unit that corrects the analog signal in accordance with at least one of a first distinctive region, in which the output angle distinctively changes with respect to change in the rotor angle, and a second distinctive region, in which the rotor angle distinctively changes with respect to change in the output angle.

10. The switching controller according to claim 9,
    wherein the output angle is substantially constant with respect to change in the rotor angle in the first distinctive region, and
    the rotor angle is substantially constant with respect to change in the output angle in the second distinctive region.

11. The switching controller according to claim 1,
    wherein the rotor angle detecting unit is a digital encoder that outputs a pulse corresponding to rotation of the rotor,
    the output angle detecting unit is an analog magnetic sensor that detects magnetism corresponding to the output angle of the output shaft, and outputs an analog signal in accordance with the magnetism,
    the main controller further includes an output angle map correcting unit that corrects an output angle detection map in accordance with at least one of a first distinctive region, in which the output angle distinctively changes with respect to change in the rotor angle, and a second distinctive region, in which the rotor angle distinctively changes with respect to change in the output angle, and
    the main controller calculates the output angle in accordance with the analog signal output from the output angle detecting unit and the output angle detection map.

12. The switching controller according to claim 11,
    wherein the output angle is substantially constant with respect to change in the rotor angle in the first distinctive region, and
    the rotor angle is substantially constant with respect to change in the output angle in the second distinctive region.

13. The switching controller according to claim 1,
wherein the electric actuator operates a shift range switching device provided to a vehicular automatic transmission, and
the detent device maintains an actual shift range of the shift range switching device.

14. The switching controller according to claim 1,
wherein the first member is a detent plate, and
the second member is a detent spring.

15. A method for controlling a switching position, the method comprising:
applying bias force so as to mechanically engage a first member with a second member at one of a plurality of detent positions defining relative positions between the first member and the second member;
controlling electricity supplied to an electric motor, thereby rotating a rotor of the electric motor;
reducing rotation of the rotor;
transmitting the rotation of the rotor to the output shaft, thereby manipulating the first member so as to switch the one of the plurality of detent positions;
detecting rotor angle of the rotor;
detecting output angle of the output shaft;
calculating a backlash amount between the rotor and the first member in accordance with at least one of occurrence of a first region, in which change in the output angle is small with respect to change in the rotor angle, and a range of the rotor angle in the first region; and
incorporating the backlash amount into the controlling electricity supplied to the electric motor.

16. The method according to claim 15, further comprising:
storing the backlash amount; and
controlling rotation of the electric motor by incorporating the backlash amount, which is stored.

17. The method according to claim 15, further comprising:
indicating a failure state so as to notify a passenger the failure state when the backlash amount is greater than a predetermined amount.

18. The method according to claim 15, further comprising:
detecting switching of the one of the plurality of detent positions in accordance with at least one of occurrence of a second region, in which change in the output angle is large with respect to change in the rotor angle, and a range of the output angle in the second region.

19. The method according to claim 18, further comprising:
recognizing a present position of the plurality of detent positions in accordance with a number of switching the plurality of detent positions.

20. The method according to claim 15, further comprising:
producing a digital signal corresponding to the rotor angle;
producing an analog signal by detecting magnetism, which corresponds to the output angle; and
correcting the analog signal in accordance with at least one of a first distinctive region, in which the analog signal distinctively changes with respect to change in the digital signal, and a second distinctive region, in which the digital signal distinctively changes with respect to change in the analog signal.

21. The method according to claim 20,
wherein the analog signal is substantially constant with respect to change in the digital signal in the first distinctive region; and
the digital signal is substantially constant with respect to change in the analog signal in the second distinctive region.

22. The method according to claim 15, further comprising:
producing a digital signal corresponding to the rotor angle;
producing an analog signal by detecting magnetism, which corresponds to the output angle; and
correcting an output angle detection map in accordance with at least one of a first distinctive region, in which the analog signal distinctively changes with respect to change in the digital signal, and a second distinctive region, in which the digital signal distinctively changes with respect to change in the analog signal; and
calculating the output angle in accordance with the analog signal and the output angle detection map.

23. The method according to claim 22,
wherein the analog signal is substantially constant with respect to change in the digital signal in the first distinctive region; and
the digital signal is substantially constant with respect to change in the analog signal in the second distinctive region.

24. The method according to claim 15, further comprising:
operating a shift range switching device provided to a vehicular automatic transmission; and
maintaining an actual shift range of the shift range switching device.

* * * * *